United States Patent
Shirai et al.

[11] Patent Number: 5,949,548
[45] Date of Patent: Sep. 7, 1999

[54] HEIGHT SENSING MEASUREMENT DEVICE

[75] Inventors: Masami Shirai, Saitama; Atsumi Kaneko, Tokyo, both of Japan

[73] Assignee: Asahi Kogaku Kogyo Kabushiki Kaisha, Tokyo, Japan

[21] Appl. No.: 09/009,334

[22] Filed: Jan. 20, 1998

[30] Foreign Application Priority Data

| Jan. 22, 1997 | [JP] | Japan | 9-023322 |
| Jan. 22, 1997 | [JP] | Japan | 9-023323 |
| Feb. 20, 1997 | [JP] | Japan | 9-052427 |
| Dec. 26, 1997 | [JP] | Japan | 9-367669 |

[51] Int. Cl.$^6$ ............................ G01B 11/00; G01C 15/00
[52] U.S. Cl. .............................. 356/375; 33/227; 33/292; 33/299; 250/559.38
[58] Field of Search ....................... 356/375; 250/559.38; 33/267, 282, 284, 285, 292, 299, 227

[56] References Cited

U.S. PATENT DOCUMENTS

| 5,028,949 | 7/1991 | Kawano . | |
| 5,051,767 | 9/1991 | Honma et al. . | |
| 5,159,760 | 11/1992 | Spiegel et al. | 33/292 |
| 5,639,966 | 6/1997 | Whitted | 33/299 |

FOREIGN PATENT DOCUMENTS

| 4-198809 | 7/1992 | Japan . |
| 5248865 | 9/1993 | Japan . |
| 9257481 | 10/1997 | Japan . |

*Primary Examiner*—F. L. Evans
*Attorney, Agent, or Firm*—Greenblum & Bernstein, P.L.C.

[57] ABSTRACT

A measurement device has a telescope supported by a main body of a total station so as to be rotatable about the horizontal axis. A vertically extending light-passing hole is formed in the main body, so that a distance measuring light wave, which is emitted through the telescope from a light-emitting element provided in the main body, can pass. A prism unit having a corner cube prism is placed on a base point. A centering operation is carried out by rotating the telescope vertically downward. Then, a distance measurement is carried out by radiating the distance measuring light wave onto the corner cube prism through the telescope.

29 Claims, 25 Drawing Sheets

HEIGHT SENSING MEASUREMENT DEVICE

BACKGROUND OF THE INVENTION

1. Field of the Invention

The present invention relates to a measurement device, such as a total station or an electronic tacheometer, and, more particularly, to a measurement device provided with a function in which an instrument height is sensed.

2. Description of the Related Art

Due to recent advances in electronics technology, a device has been developed, enabling an electronic distance measurements to be performed, in which a light wave, radiated along an optical axis, is reflected by an object and received, thereby allowing a distance between the device and the object to be derived. The electronic distance measurement is carried out in such a manner that a known point in the measurement device is set as the origin, and the origin is fixed with respect to a vertical line passing through a station on the ground. For calculating the altitude of the station from the distance measurement data obtained by the measurement device, a vertical distance between the origin and the station, i.e. the instrument height, is required.

Conventionally, a measurement of the instrument height has been carried out in such a manner that an end of a tape measure is attached to an engaging metal fitting, disposed on a side surface of the main body of the measurement device, so that the other end of the tape measure extends to the ground, enabling the scale formed on the tape measure to be read.

However, by engaging the tape measure with a side surface of the main body of the measurement device, since a position where the tape measure is attached and the station of the ground are horizontally spaced apart from each other, an error easily occurs in the resulting measurement of the instrument height. Further, since the accuracy of the tape measure is low, it is difficult to detect the instrument height with a high degree of accuracy, and therefore, the accuracy of the resulting measurement would be low even if a highly accurate distance measurement was carried out using an electronic distance meter.

SUMMARY OF THE INVENTION

Therefore, an object of the invention is to provide a measurement device by which an instrument height can be easily obtained with a high accuracy.

According to the present invention, there is provided a measurement device comprising a main body, a telescope, a radiation mechanism, a directing mechanism and a measuring processor.

The telescope, supported by the main body, rotates about a horizontal axis of the main body. The radiation mechanism radiates a distance measuring light wave, which is outputted from the measurement device through the telescope. The directing mechanism leads the distance measuring light wave to a target point, which is located at a position vertically under the main body. The measuring processor measures a distance from a predetermined point of the measurement device to the target point, using data derived from the distance measuring light wave directed to the target point.

Preferably, the directing mechanism comprises a light-passing hole, through which the distance measuring light wave passes, which extends in a vertical direction.

Preferably, the measuring processor measures the distance by sensing a light beam, generated due to the distance measuring light wave, which is reflected by the target point.

Optionally, the measurement device further comprises a main reflecting member, which may be a corner cube prism, disposed at the target point, so that the light wave outputted by the radiating mechanism is reflected.

Preferably, the main body comprises a handle in which a sub-reflecting member is provided, so that the telescope can be sighted through the sub-reflecting member, when the telescope is directed vertically downward.

The measurement device may further comprise an optical member, for changing a magnification index, disposed on an optical path of the telescope in such a manner that the optical member and the telescope are respectively disposed on opposite sides of the reflecting member.

The measurement device may further comprise an altitude-graduated circle for measuring an angle of the telescope about the horizontal axis.

The measurement device may further comprise an optical member for changing a diameter of a luminous flux of the distance measuring light wave.

The measurement device may further comprise an anti-reflection member preventing the distance measuring light wave from being reflected by a surface of the main body.

The measurement device may further comprise a centering telescope, having an optical member which reflects a visible light and transmits the distance measuring light wave.

The measurement device may further comprise a positioning mechanism for determining whether or not the telescope is coincident with the vertical axis.

Further, according to the present invention, there is provided a measurement device comprising a telescope, a first reflecting member, a detecting mechanism, and an obtaining processor.

The first reflecting member is disposed in front of the telescope so that the optical axis of the telescope is bent. The detecting mechanism detects a station which is positioned on the optical axis bent by the first reflecting member. The obtaining processor obtains an instrument height of the measurement device based on a positional relationship between the telescope, the first reflecting member and the station.

Preferably, the first reflecting member is detachably attached to the telescope.

The measurement device may further comprise a radiation mechanism radiating a distance measuring light wave, which is outputted through the telescope; a second reflecting member, located at the station, reflecting the distance measuring light wave to the telescope through the first reflecting member; and a measuring processor measuring a first distance from a predetermined point located in the measurement device to the second reflecting member via the first reflecting member. The obtaining processor obtains the instrument height based on a first height of the station and a second height from the station to the predetermined point, the second height being calculated based on the first distance, a second distance from the predetermined point to the first reflecting member, and an angle by which the optical axis is bent.

Preferably, the second reflecting member, which may be a corner cube prism, is rotatable about a horizontal axis.

The measurement device may further comprise an indicator indicating the instrument height.

The measurement device may further comprise a measuring processor measuring a rotational angle of the first reflecting member about a horizontal axis when a base point is sighted through the telescope and the first reflecting member. The obtaining processor obtains the instrument height based on a distance from the predetermined point to the first reflecting member, the rotational angle, and an angle of deviation by which the optical axis is bent.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
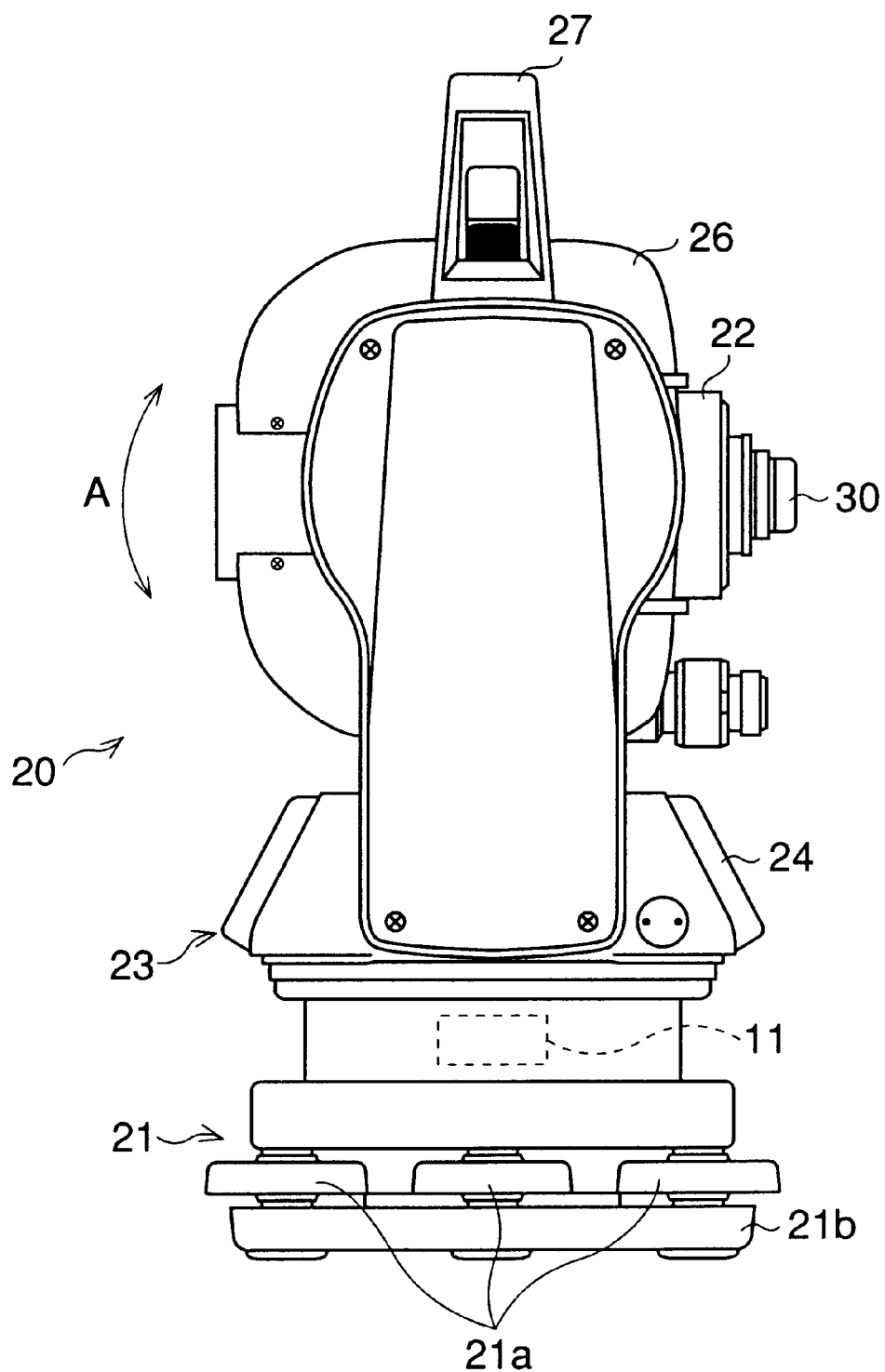
FIG. 1 is a side view showing a total station to which a first an embodiment of the present invention is applied.

The present invention will be described below with reference to embodiments shown in the drawings.

Figure 2:
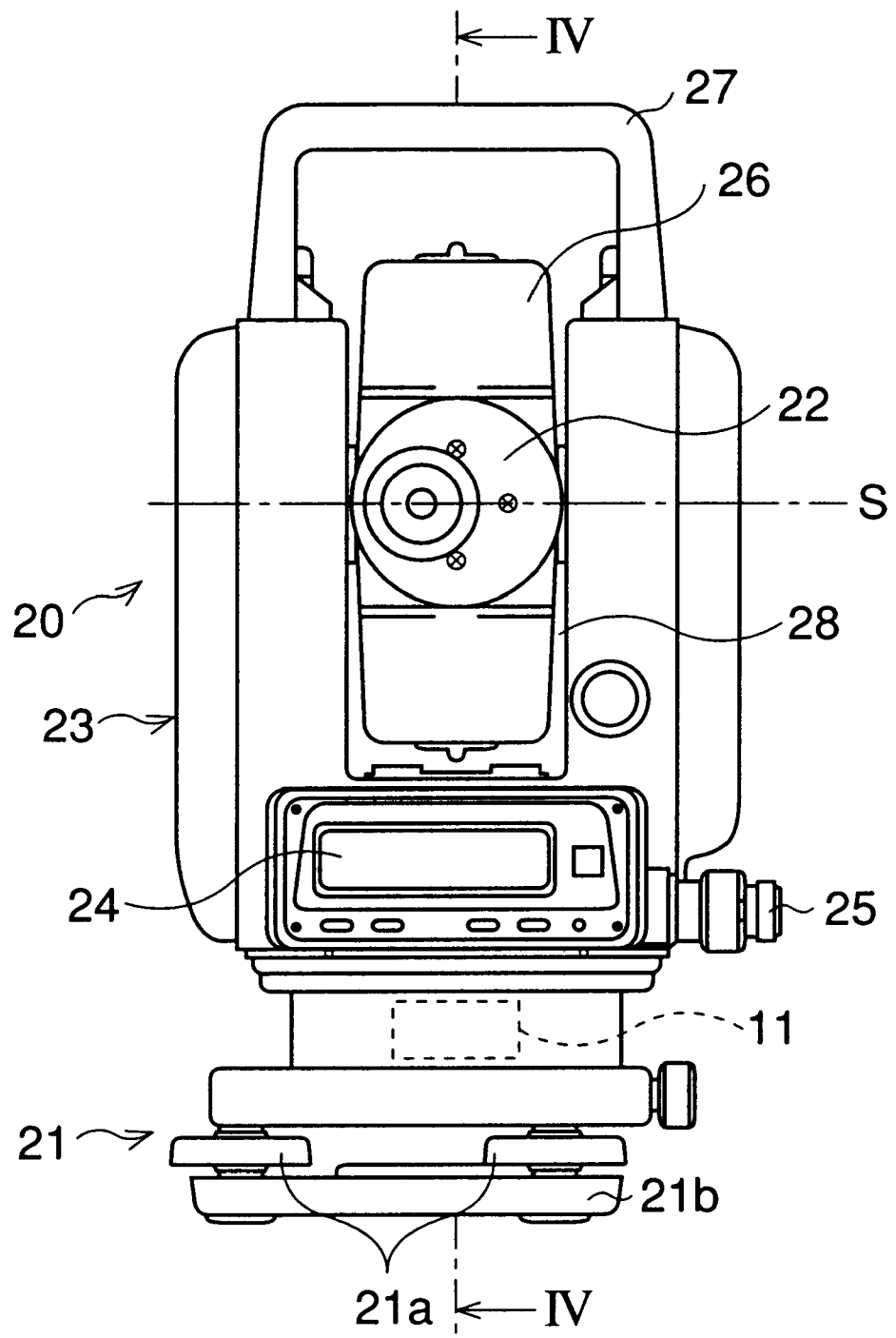
FIG. 2 is a front view of the total station shown in FIG. 1.
Figure 3:
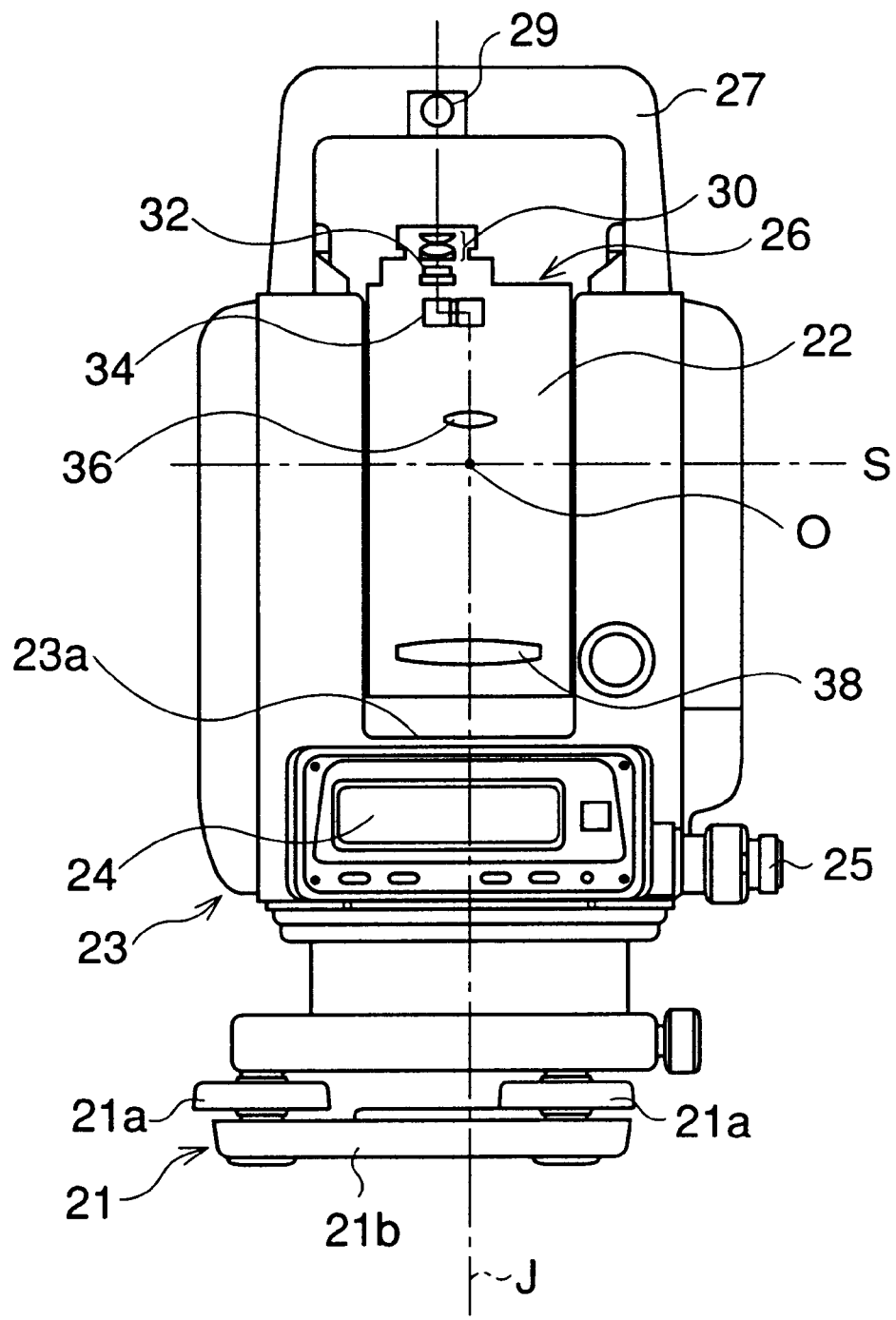
FIG. 3 is a front view of the total station of FIG. 1, in which a telescope is rotated by 90 degrees about a horizontal axis, the internal structure of the telescope being schematically indicated.
Figure 4:
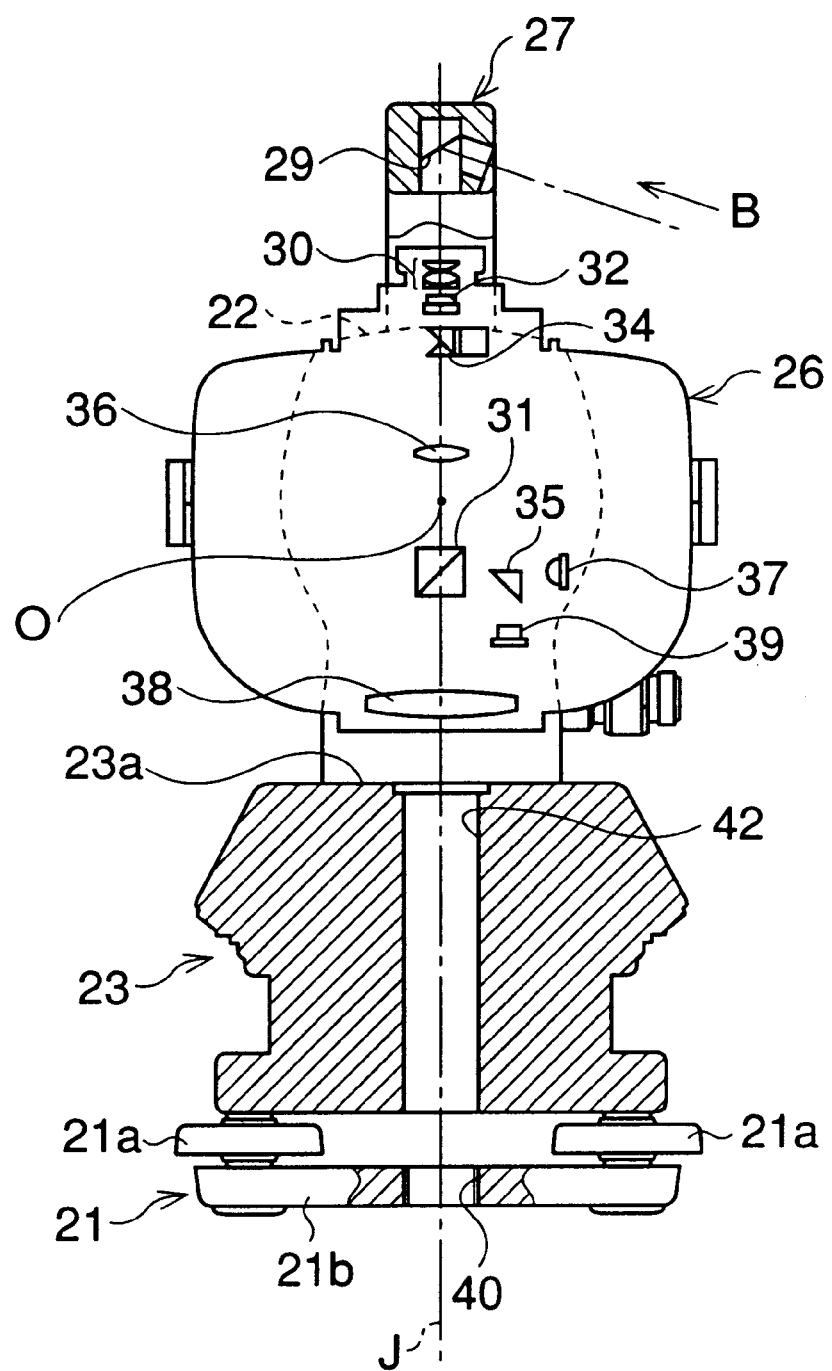
FIG. 4 is a view along line IV—IV of FIG. 2, with the telescope oriented in the same direction as in FIG. 3.

FIGS. 1 through 4 show a total station to which a first embodiment of the present invention is applied. FIGS. 1 and 2 are a side view and a front view of the total station, respectively. FIG. 3 is a front view of the total station in which a telescope is rotated by 90 degrees about a horizontal axis, the internal structure of the telescope being schematically indicated. FIG. 4 is a view along IV—IV line of FIG. 2, with the telescope oriented in the same direction as in FIG. 3.

The total station 20 is provided with a base 21 connected to a tripod (not shown). The base 21 has a fixed plate 21b, to which the tripod is connected, supporting three horizontal adjusting members 21a. A threaded hole 40, in which a connecting screw for connecting the tripod is threadingly fitted, is formed in a center of the fixed plate 21b. By rotating the horizontal adjusting members 21a about the respective axes, the total station 20 can be moved upward and downward relative to the tripod, so that the total station 20 can be adjusted about a horizontal plane.

A main body 23 is disposed above the base 21, and is rotatable about a vertical axis J passing through the center of the total station 20. The main body 23 is rotated about the vertical axis J by operating an adjusting screw 25. An indicating unit 24 is provided at a lower portion of the main body 23, to indicate various information regarding the total station 20 or a measurement result. A microcomputer 11 is provided in the main body 23 to control devices provided in the total station 20 and to carry out various calculations. A light-passing hole 42 is formed in the main body 23, and penetrates from the center of an upper surface 23a through to a bottom surface of the main body 23. The light-passing hole 42 is coaxially aligned with the threaded hole 40.

A telescope holding space 28 is formed in the main body 23, with the telescope unit 26 disposed therein. The telescope unit 26 is supported by the main body 23 to rotate about a horizontal axis S (in a direction shown by an arrow A). A telescope 22 is provided approximately in the center of the telescope unit 26, and is rotated, integrally with the telescope unit 26, about the horizontal axis S. A handle 27, mounted above the main body 23, traverses the telescope holding space 28.

When centering the total station 20 or measuring the instrument height of the total station 20, the telescope 22 is rotated about the horizontal axis S by 90 degrees from the state shown in FIG. 1. Namely, in an operation, such as centering, the total station 20 is used in a state in which the optical axis of the telescope 22 is coincident with the vertical axis J.

The telescope 22 is provided with an eyepiece 30, a focusing glass 32, a Porro prism 34, an intermediate lens 36 and an object lens 38. A dichroic mirror 31, which reflects only infrared rays, is disposed between the intermediate lens 36 and the object lens 38, and a prism 35, a light-emitting element 37 and a light-receiving element 39 are provided beside the dichroic mirror 31.

The light-emitting element 37 radiates infrared rays (i.e. the distance measuring light wave), which are reflected by the dichroic mirror 31, and become incident on and emerge from the object lens 38. The infrared rays are reflected by a station marker, for example, and are directed back to the dichroic mirror 31 through the object lens 38. Then, the infrared rays are reflected by the dichroic mirror 31 and are led to the light-receiving element 39 via the prism 35.

Figure 5:
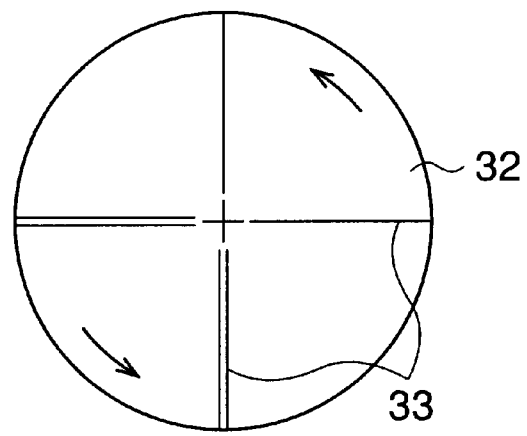
FIG. 5 is a front view showing a focusing glass of the total station of FIG. 1.

An image of the object, which the telescope 22 faces, is formed on the focusing glass 32 by the intermediate lens 36 and the object lens 38. As shown in FIG. 5, a cross-hairs 33, for recognizing the center of the focusing glass 32, are formed on the focusing glass 32. Further, a reflection member or a reflection mirror 29 is mounted at the center of the handle 27, facing the eyepiece lens 30 when the telescope 22 is rotated, so as to be coincident with the vertical axis J.

Accordingly, in a state in which the telescope 22 is rotated downward to be coincident with the vertical axis J, an image of a station marker, for example, positioned on the axis J, under the main body 23, is formed on the focusing glass 32 through the threaded hole 40 and the light-passing hole 42. The image on the focusing glass 32 can be observed via the eyepiece lens 30 and the reflection mirror 29, so that the sighting of the telescope 22 can be performed. Note that the direction, in which the sighting is performed, is coincident with the vertical axis J in FIGS. 3 and 4.

The eyepiece lens 30 is detachable from the telescope 22. By changing the eyepiece lens 30, the magnification of the telescope 22 can be altered.

Figure 6:
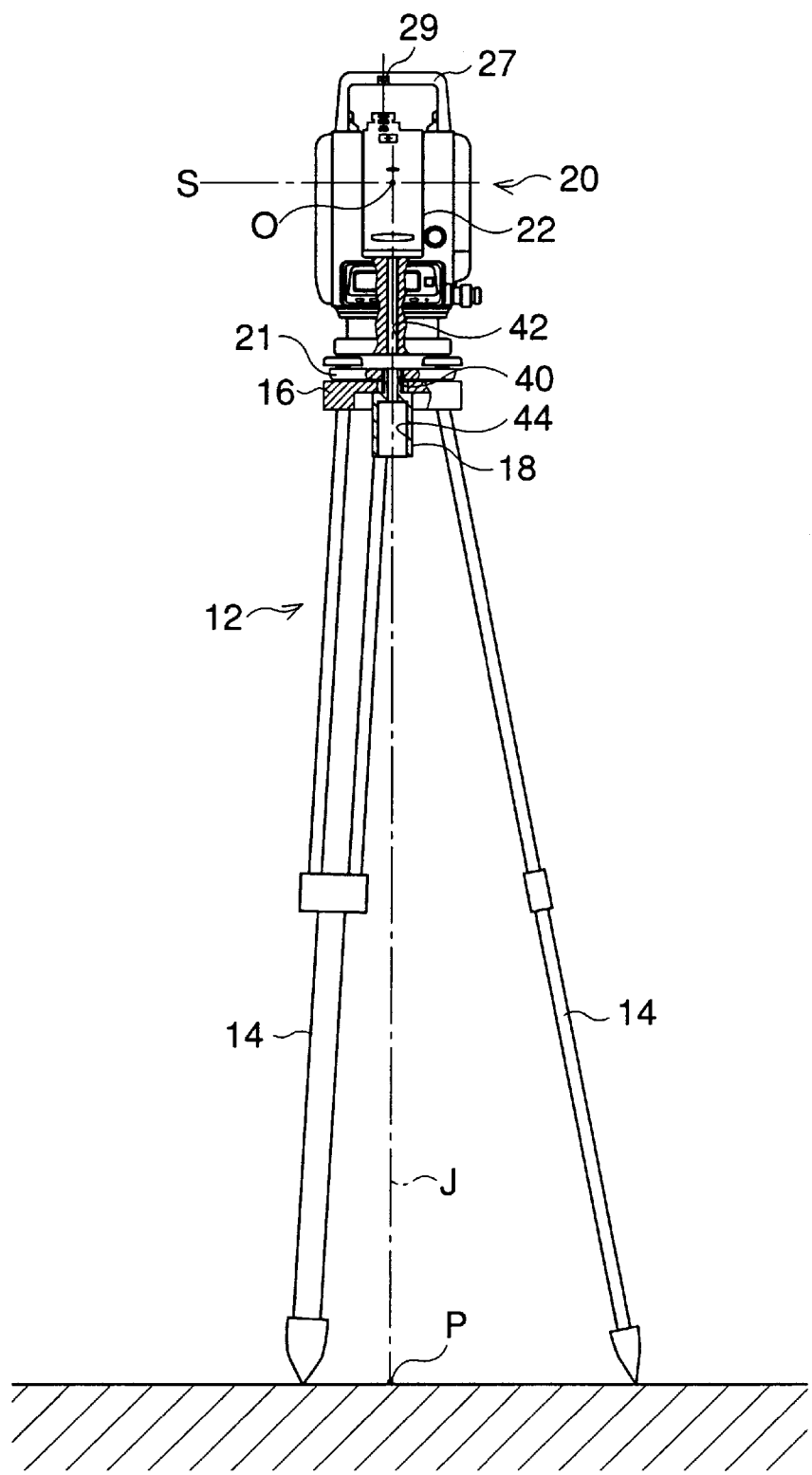
FIG. 6 is a partially sectional front view showing the total station of FIG. 1, attached to a tripod, so that a centering operation can be performed.

FIG. 6 shows a partially sectioned front view of the total station 20 and the tripod 12, which are arranged to execute a centering operation of the total station 20.

The tripod 12 has three telescopically extendable legs 14. In the centering operation, the tripod 12 is positioned above the station marker, for example, and the total station 20 is set on the tripod 12. A fixing screw 18 is upwardly inserted into a neck portion 16 of the tripod 12, is threadingly fitted in the threaded hole 40, formed in the fixed plate 21b, and is marginally tightened. A light-passing hole 44 is formed so as to extend along the axial direction of the central portion of the fixing screw 18, in order to face the light-passing hole 42 of the main body 23.

In this state, the telescope 22 is rotated about the horizontal axis S in such a manner that the optical axis thereof is coincident with the vertical axis J. This operation is performed while observing the scale formed on the altitude graduated circle (or protractor) (not shown). The altitude graduated circle is usually provided in a measurement device, such as a distant measuring device, to calculate a rotational angle moved in a horizontal or a vertical direction by the telescope, and incorporates an optical rotary encoder, for example.

Then, while observing the telescope 22 in the direction of the arrow B (see FIG. 4) through the reflection mirror 29 in the handle 27, the positions of the eyepiece 30 and the intermediate lens 36 on the optical axis are adjusted, so that a base point (target) P, defined by a mark formed on the upper surface of the station marker, becomes focused. After this focusing operation, the fixing screw 18 is loosened. Then, the total station 20 is moved along the surface of the neck portion 16 until the cross-hairs 33 of the focusing glass 32 and the base point P are coincident with each other. The fixing screw 18 is then refastened, and the centering of the total station 20 is completed.

Figure 8:
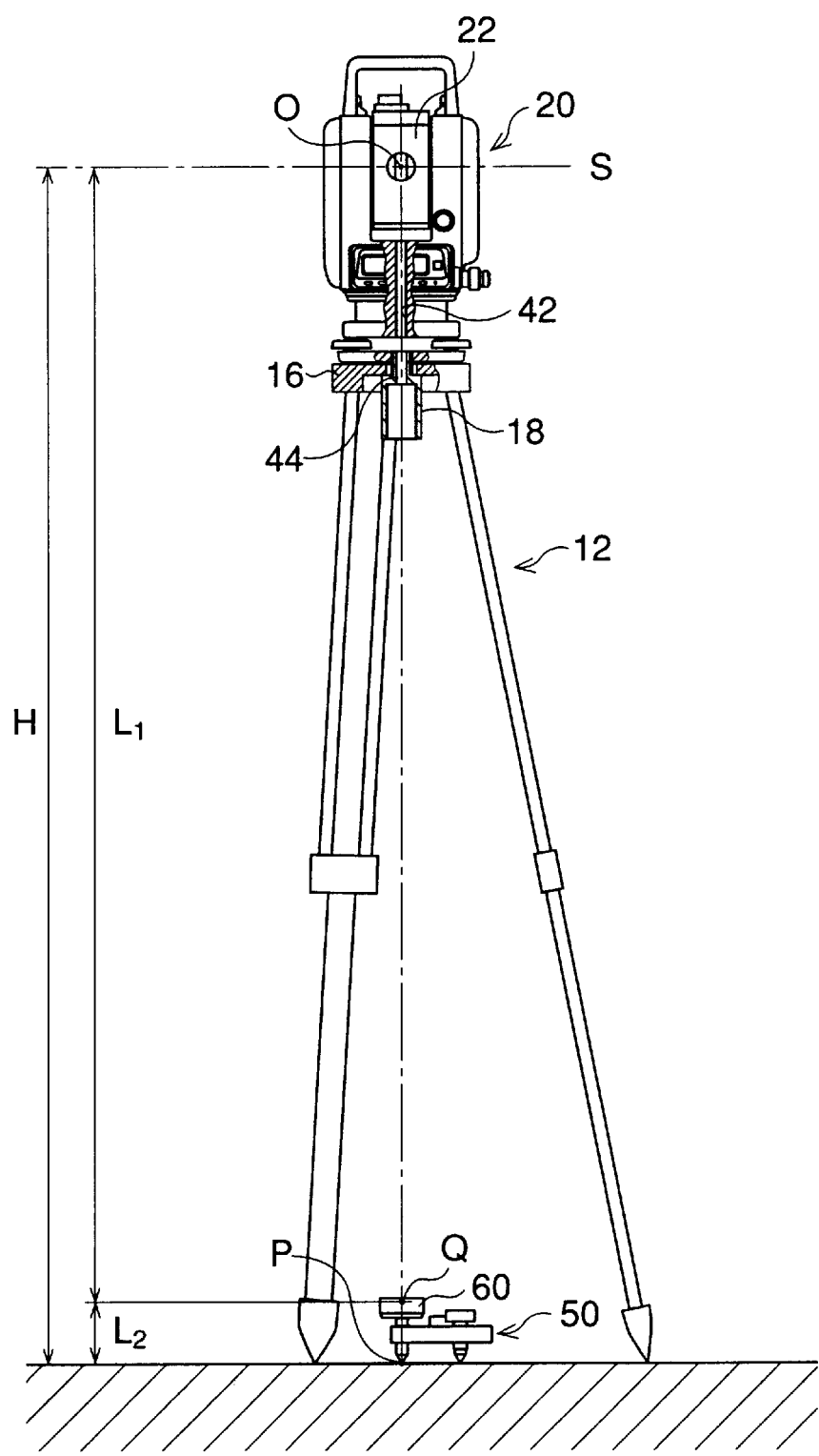
FIG. 8 is a view showing the total station with the tripod and a prism unit used in measuring the instrument height, according to the first embodiment.
Figure 9:
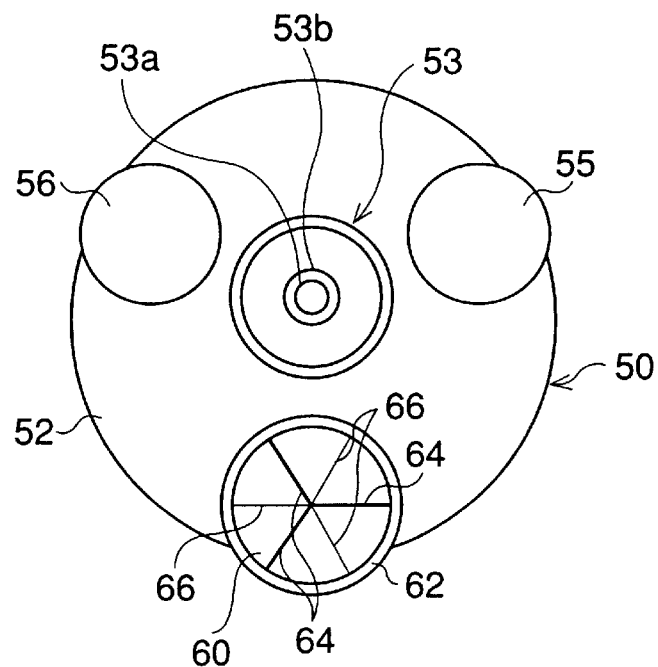
FIG. 9 is a plan view of the prism unit shown in FIG. 8.
Figure 10:
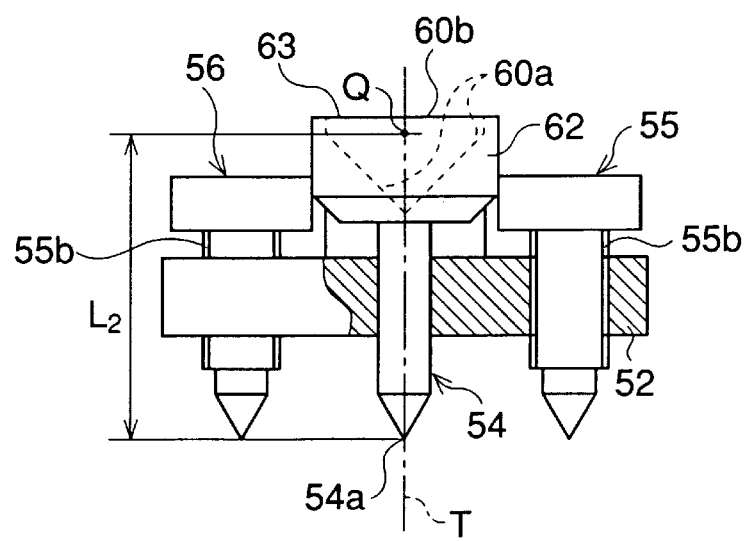
FIG. 10 is a partially sectioned front view showing the prism unit of FIG. 8.

FIG. 8 shows the total station 20 with the tripod 12 and a prism unit 50 used in measuring the instrument height. In this drawing, the prism unit 50 is placed on the base point P. FIG. 9 is a plan view of the prism unit 50. FIG. 10 is a partially sectioned view showing the prism unit 50.

The prism unit 50 has a disk-shaped leveling board 52. The leveling board 52 is provided with three pins, projecting from the bottom thereof, being a base pin 54 vertically extending through the leveling board 52, and two leveling pins 55 and 56 threadingly fitted in and passing through the leveling board 52. The pins 54, 55, 56 are arranged on the periphery of the leveling board 52 at approximately equal intervals. The leveling board 52 is placed on the ground supported by the pins 54, 55, 56.

A prism cover 62 is mounted on the upper end of the base pin 54, and a corner cube prism (i.e. reflecting member) 60 is located in the prism cover 62. A tip portion 54a of the base pin 54 is set on the base point P on the ground. The length from the tip portion 54a to an arbitrary set point (i.e. target point) Q in the corner cube prism 60 is referred to as a prism height L2, and the central axis of the base pin 54 is referred to as a base point axis T. Note that the arbitrary set point Q is determined in accordance with the prism constant of the corner cube prism 60. The leveling pins 55 and 56 have threaded portions 55b and 56b, respectively, which are threadingly fitted in the leveling board 52. Therefore, by rotating the leveling pins 55 and 56 about the respective axes, the horizontal condition of the leveling board 52 can be adjusted so that the base point axis T becomes vertical.

A bubble tube 53 is disposed approximately at the center of the upper surface of the leveling board 52 to determine the horizontal condition of the leveling board 52. The bubble tube 53 is provided with a bubble 53a and a circular mark 53b for a visual check, and is disposed in such a manner that the base plane of the bubble tube 53 is perpendicular to the base point axis T.

The corner cube prism 60 is a reflecting prism, having three mirrored surfaces which are perpendicular to each other, manufactured by removing a corner of a glass cuboid and grinding the cut plane to a specified radius, and having a central axis which is normal to the cut plane and which passes through the common vertex. Namely, the corner cube prism 60 has three reflecting planes 60a, which are perpendicular to each other and which are in contact with the inner wall of the prism cover 62, and a prism plane 60b, which is coplanar to a surface 63 of a mouth of the prism cover 62. As shown in FIG. 9, when viewing from the prism plane 60b of the corner cube prism 60, three sides 64, each of which is formed between two adjacent reflecting planes, and the images 66 of the sides 64 appear to intersect each other on the prism plane 60b. The base point axis T passes through the point of intersection of the six sides. Note, in the drawing, the sides 64 are shown by thick lines, and the images 66 of the sides 64 are shown by thin lines.

A measurement of the instrument height will be described below. The measurement of the instrument height is carried out with the prism unit 50 arranged under the total station 20 after the centering operation described above.

Figure 7:
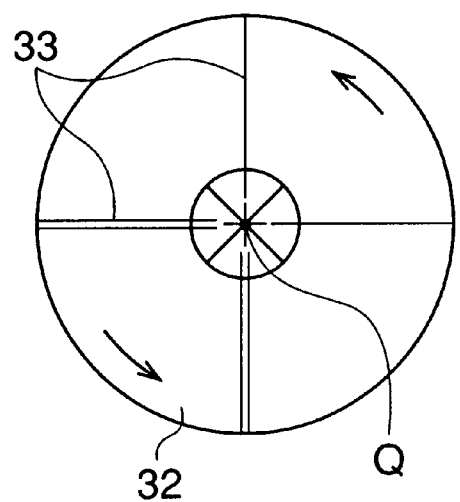
FIG. 7 is a view showing an image formed on a focusing glass in the centering operation, according to the first embodiment.

First, a sighting of the corner cube prism 60 is carried out through the telescope 22, so that the cross-hairs 33 of the focusing glass 32 are adjusted to the arbitrary set point Q of the corner cube prism 60 (see FIG. 7). A distance measurement is carried out under this condition. Namely, infrared rays are radiated from the light-emitting element 37, are reflected by the corner cube prism 60, and are directed to the light-receiving element 39. Based on the received infrared rays, a signal corresponding to the distance from the light-emitting element 37 to the corner cube prism 60 is outputted by the light-receiving element 39. This signal is subjected to a predetermined process in the microcomputer 11, so that the distance, from the center O of the total station 20 to the arbitrary set point Q of the corner cube prism 60, is calculated.

The height L2 from the ground to the arbitrary set point Q can be changed to another height by altering the prism constant. The data of the height L2 is stored in a memory provided in the microcomputer 11, as a prism height.

When the distance L1 from the center O of the total station 20 to the arbitrary set point Q of the corner cube prism 60 is obtained in a way as described above, the instrument height H is obtained, according to equation (1), by the microcomputer 11.

$$H = L1 + L2 \qquad (1)$$

If the station marker is recessed into or is projected from the ground surface, the recessed or projected amount ΔH is detected using a measuring instrument such as a vernier caliper, and the recessed or projected amount ΔH is added to or deducted from the instrument height H obtained by the equation (1), so that the instrument height is corrected. The numerical value of the corrected instrument height is indicated by the indicating unit 24 if necessary. Note that the data of the instrument height can be stored in the memory of the microcomputer 11, so as to be used as a part of the data required for a measurement.

As described above, according to the first embodiment, the instrument height can be detected with a high accuracy, using the telescope 22 for a distance measurement. Further, according to the first embodiment, since the reflection mirror 29, mounted in the handle 27, and the telescope 22, used in a distance measurement, are utilized when the centering is carried out, a separate centering telescope is not required. Thus, the total station 20 can be miniaturized or lightened, and the manufacturing cost can be reduced.

Furthermore, in the first embodiment, since the corner cube prism 60 is placed above the base point P, the instrument height H can be obtained with a higher accuracy. Namely, although the distance from the total station 20 to the base point P can be directly detected without placing the prism unit 50 on the base point P, it is preferable to use a reflecting member, such as the prism unit 50, so as to obtain a highly accurate instrument height, thus enabling a highly accurate distance measurement to be performed. Note that a reflecting sheet can be utilized as the reflecting member.

Figure 11:
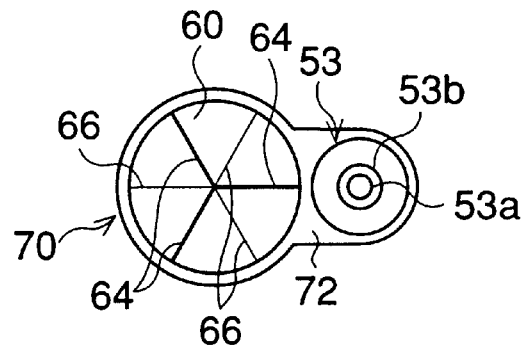
FIG. 11 is a plan view showing a prism unit provided in a total station to which a second embodiment of the present invention is applied.
Figure 12:
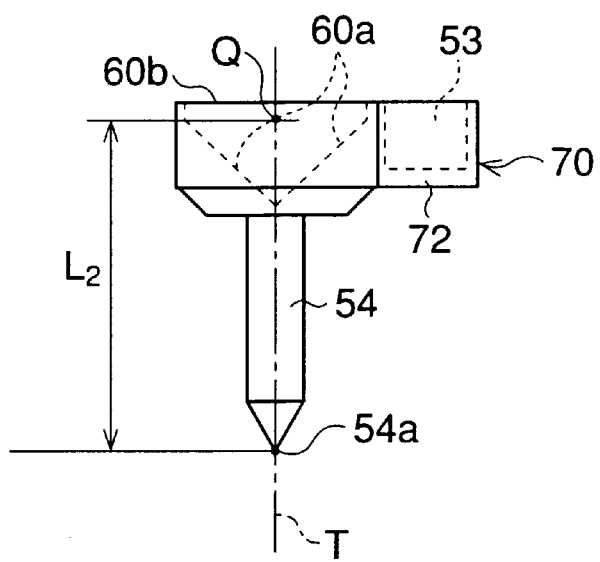
FIG. 12 is a side view showing the prism unit shown in FIG. 11.

FIGS. 11 and 12 show a prism unit 70 of a second embodiment. Since the construction of the total station is the same as that of the first embodiment, the description thereof is omitted.

The prism unit 70 has a casing 72 provided on the upper end of the base pin 54. A corner cube prism 60 and a bubble tube 53 are provided in the casing 72. The corner cube prism 60 is placed in such a manner that a prism plane 60b is normal to the base point axis T which is the center axis of the base pin 54. The bubble tube 53 is placed in such a manner that the surface thereof is also normal to the base point axis T.

When a distance measurement is performed using the total station of the second embodiment, the prism unit 70 is held by an operator, such that a bubble 53a of the bubble tube 53 is positioned at the center of the circular mark 53b.

According to the second embodiment, the prism unit 70 is not supported by a support member, such as the leveling board 52 (see FIG. 10), and thus, the operator has to hold the prism unit 70. However, the construction of the prism unit 70 is simplified, enabling the manufacturing cost to be restricted. Further, according to the second embodiment, similarly to the first embodiment, the instrument height is easily obtained with a high accuracy by using the telescope for a distance measurement in conjunction with the corner cube prism 60 when performing a height measurement.

In the second embodiment, when a specific reflecting member is not provided to the station, and a non-prism type light wave distance measuring device, which senses a distance measuring light wave coming from the station, is used, the instrument height can be obtained by sensing the distance measuring light wave reflected by the base point without placing a reflection member on the base point.

Figure 13:
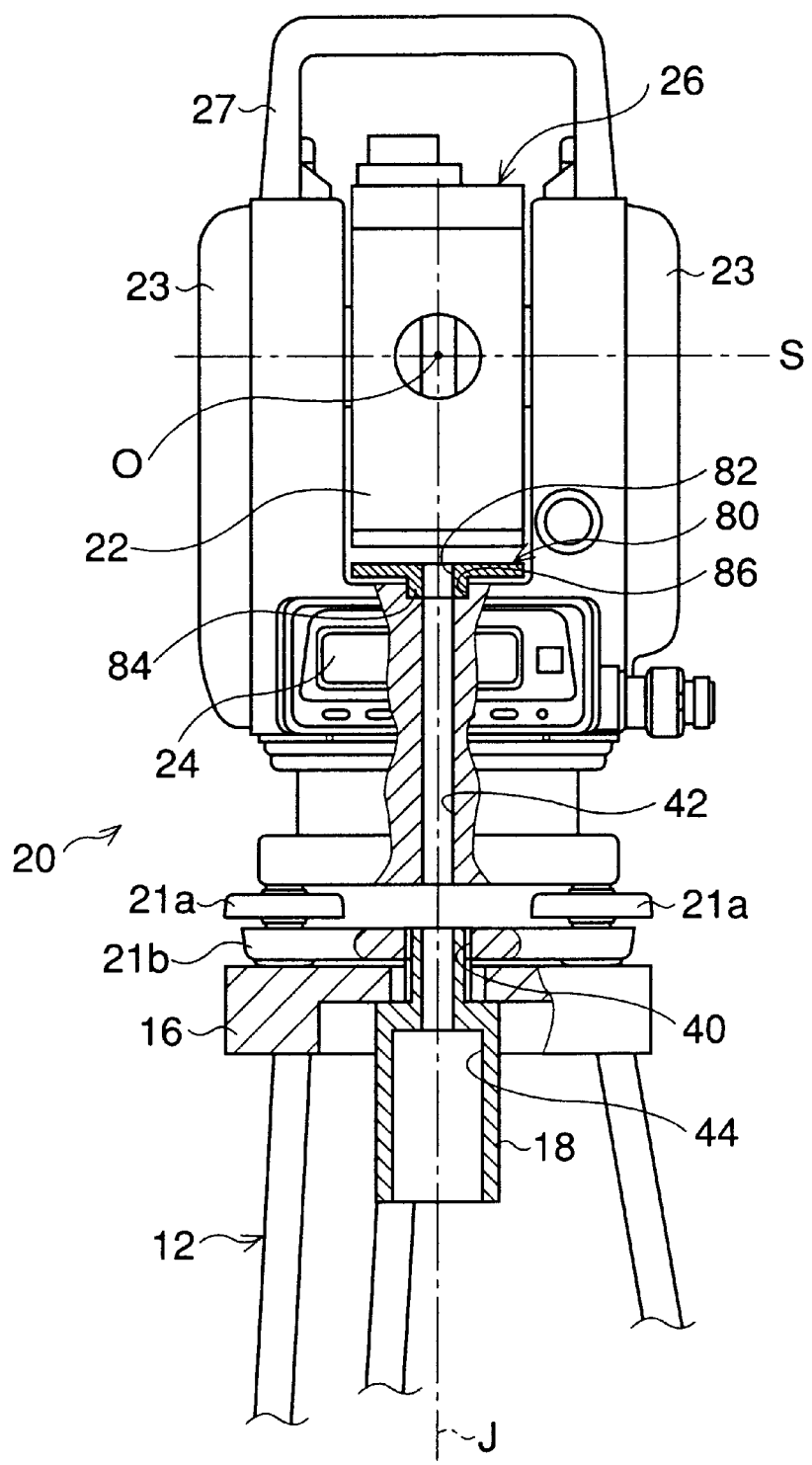
FIG. 13 is a partially sectioned front view showing a total station, of a third embodiment, with a tripod.

FIG. 13 shows a third embodiment of the present invention. In the third embodiment, an antireflection adaptor 80 is provided in the total station 20. Since the other constructions in the third embodiment are the same as those of the first embodiment, the descriptions of the other constructions are omitted.

The diameter of the luminous flux of the distance measuring light wave is approximately equal to the diameter of he object lens, and it is difficult to enlarge the diameter of the light-passing hole 42, because of the space in the main body 23. Therefore, usually, the diameter of the luminous flux of the distance measuring light wave is larger than the diameter of the light-passing hole 42, and thus, the light wave is reflected by an outer surface of the total station 20. The component of the reflected light wave by the outer surface produces interference, which affects the accuracy of the distance measurement. The antireflection adaptor 80 is provided for preventing the reflection of the distance measuring light wave, and is disposed between the telescope 22 and the main body 23.

The antireflection adaptor 80 has a light-passing hole 82, the diameter of which is approximately the same diameter as that of the light-passing hole 42 formed in the main body 23. In the antireflection adaptor 80, at least the top surface facing the telescope 22 and the inner wall of the light-passing hole 82 are treated with an antireflection process, such as a black coating. The antireflection adaptor 80 has a positioning ring 84, which is fitted in a positioning hole 86 formed in the main body 23. Thus, the light-passing hole 82 is positioned in such a manner that the axis of the light-passing hole 82 is coincident with the vertical axis J, and a distance measuring light wave, which is emitted from the telescope 22 and passes through the antireflection adaptor 80, enters the light-passing hole 42 without generating interference.

Therefore, according to the third embodiment, not only can the instrument height be obtained with a high accuracy, due to the use of the telescope 22 for a measurement, but also a reflection of the light wave by the outer surface of the total station is prevented, due to the provision of the antireflection adaptor 80, so that a distant measurement value can be obtained with a high accuracy.

Note that, in the third embodiment, although the antireflection adaptor 80 is mounted to prevent a reflection of the distance measuring light wave by the outer surface, an optical unit, such as a beam expander, can replace the antireflection adaptor 80, so that the diameter of the luminous flux of the light wave is changed. Further, the antireflection process can be applied to a portion of the outer surface of the main body 23 where the distance measuring light wave enters.

Figure 14:
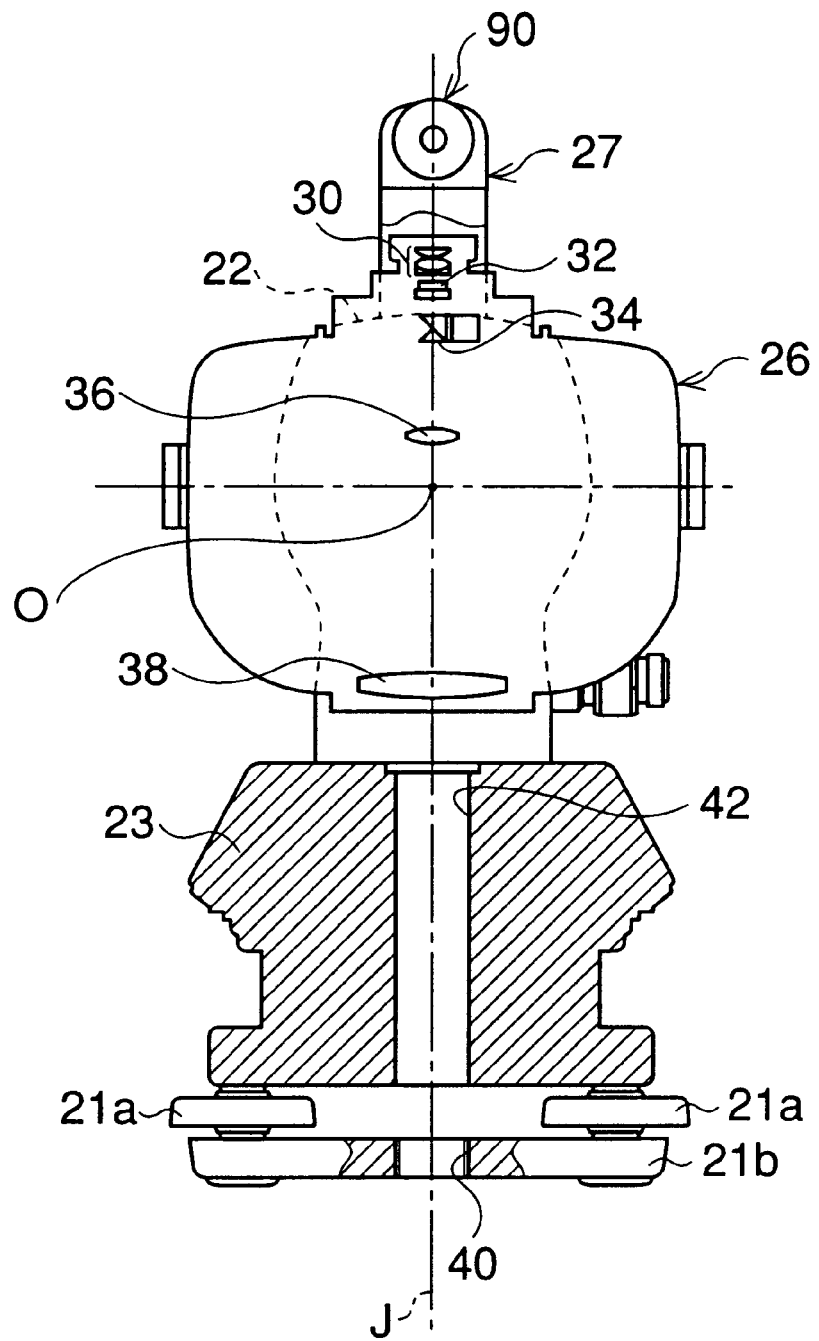
FIG. 14 is a sectional side view showing a total station of a fourth embodiment of the present invention.
Figure 15:
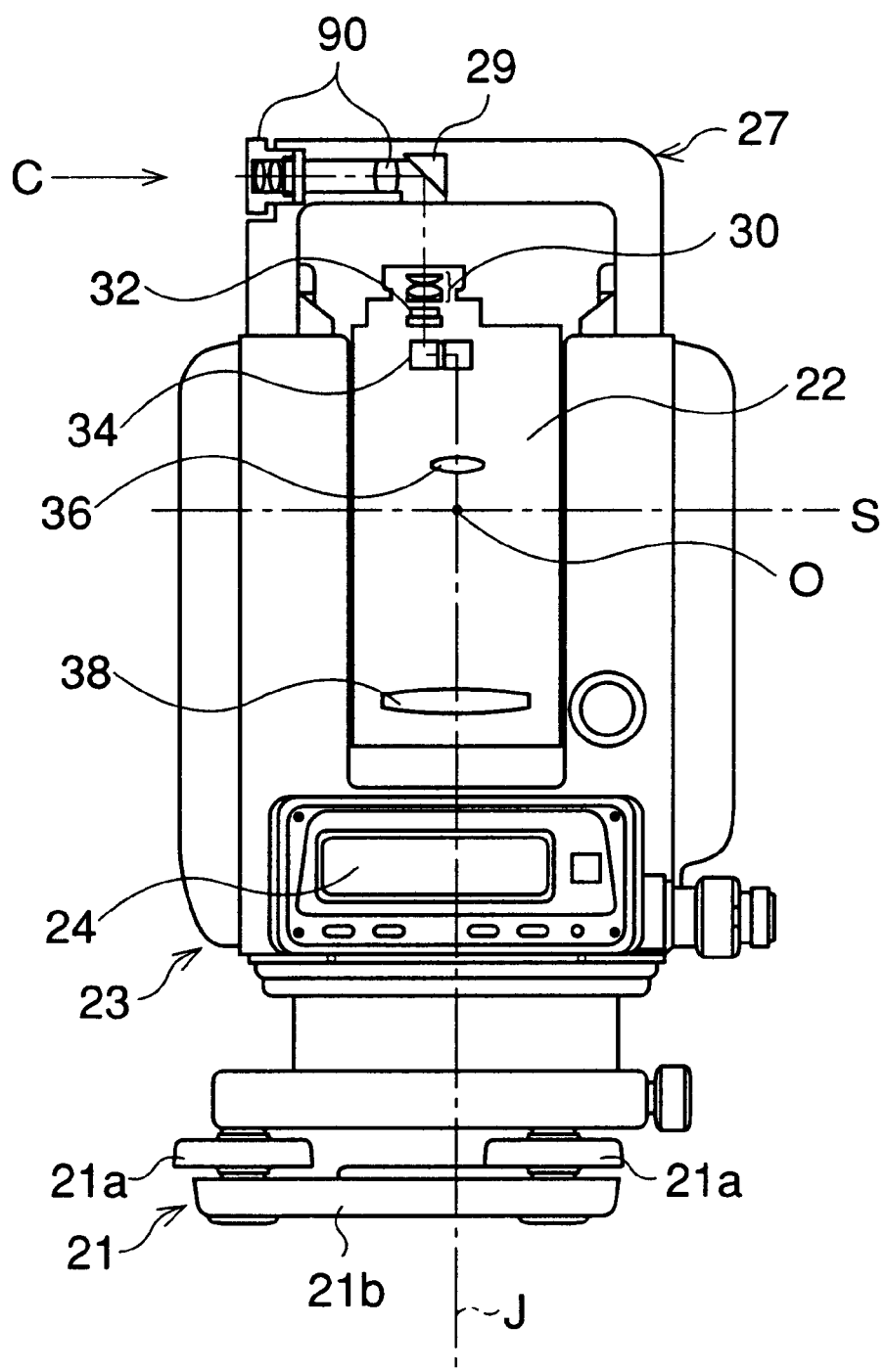
FIG. 15 is a front view of the total station shown in FIG. 14, with the optical path of the telescope schematically represented.

FIGS. 14 and 15 show a fourth embodiment of the present invention. In the fourth embodiment, a zoom optical system 90 is disposed in the handle 27 of the total station 20, close to the reflection mirror 29, with the other constructions being the same as those of the first embodiment.

The zoom optical system 90 is provided for changing a magnification index so that the base point P is easily sighted in a centering operation. The zoom optical system 90 is housed in the handle 27 in such a manner that the eyepiece lens of the zoom optical system 90 faces the end portion of the handle 27. Therefore, the target (i.e. the base point) can be sighted through the zoom optical system 90, the reflection mirror 29, the telescope 22, and the light-passing hole 42 in a direction shown by an arrow C. The optical axis regarding the sighting is indicated in FIGS. 14 and 15 by a chained line, and is coincident with the vertical axis J. In other words, the zoom optical system 90 is disposed on an optical path of the telescope 22 in such a manner that the zoom optical system 90 and the telescope 22 are respectively disposed on opposite sides of the reflection mirror 29.

Therefore, according to the fourth embodiment, not only can the instrument height be obtained with a high accuracy due to the use of the telescope 22 for a measurement, but also an accuracy of the centering can be improved by using the zoom optical system 90.

Figure 16:
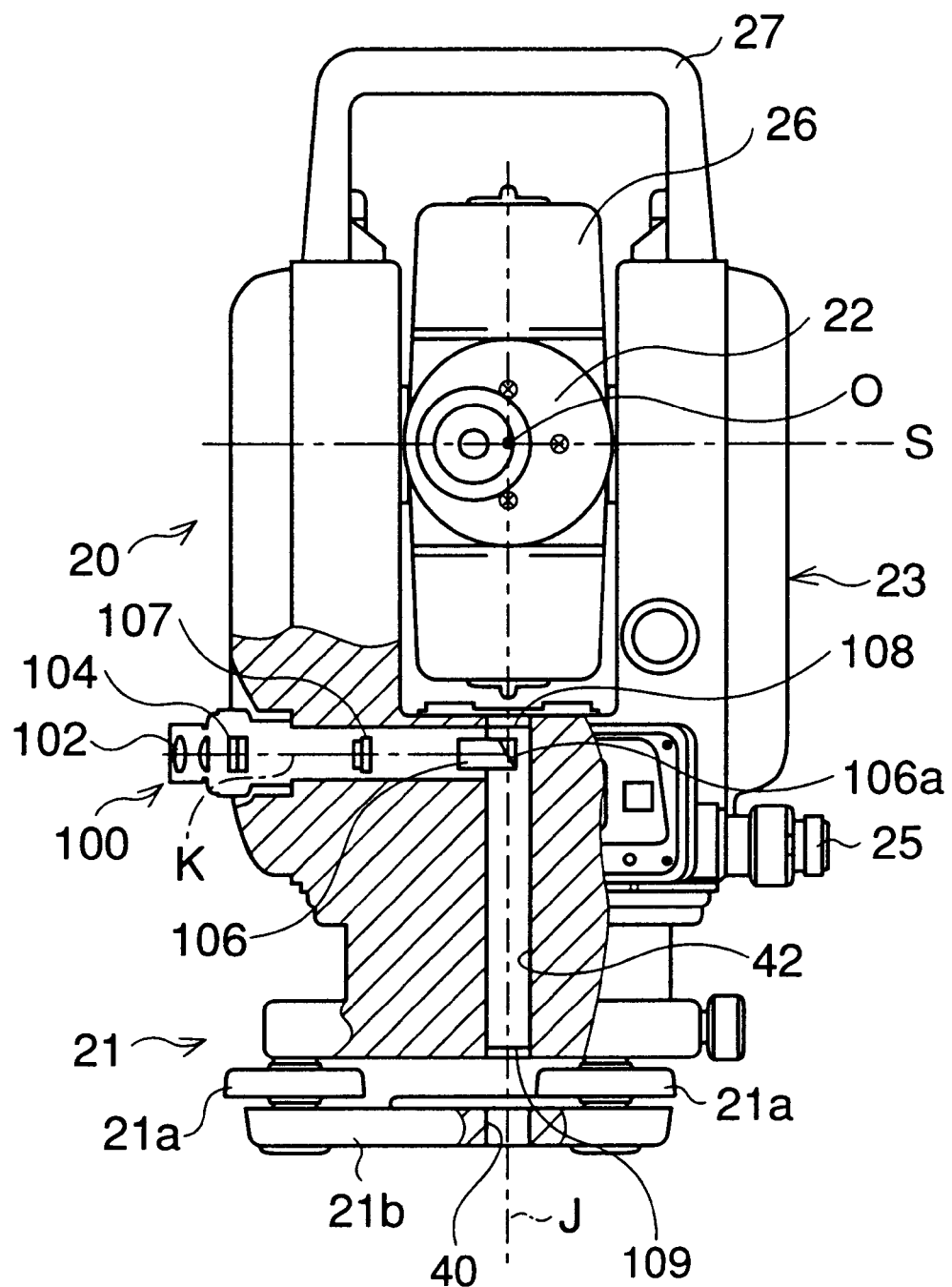
FIG. 16 is a partially sectioned front view showing a total station of a fifth embodiment of the present invention.

FIG. 16 shows a fifth embodiment of the present invention. In the fifth embodiment, a centering telescope 100 is provided. Namely, while the telescope 22 for a measurement is used to carry out the centering operation in the first through fourth embodiments, the centering telescope 100 is used to carry out the centering operation in the fifth embodiment.

The centering telescope 100 is disposed below the telescope 22 of the main body 23. An eyepiece lens 102, a centering focusing glass 104, an optical member 106 and an object lens 107 are mounted in the centering telescope 100. A beam splitter 106*a*, formed at a tip portion of the optical member 106, is positioned in the light-passing hole 42, so that the optical axis K of the centering telescope 100 is bent in such a manner that a part of the optical axis is coincident with the vertical axis J. A coating, which transmits the distance measuring light wave and reflects visible light, is applied to the beam splitter 106*a*.

Cover glasses 108 and 109, which are transparent, are provided in the mouths of the upmost and lowest positions of the light-passing hole 42, so that the light-passing hole 42 is weatherproofed. The other constructions are the same as those of the first embodiment.

As described above, in the fifth embodiment, the optical member 106, to which a coating transmitting only a distance measuring light wave is applied, is provided, and the light-passing hole 42, incorporating the centering telescope 100, is formed in the total station 20. Therefore, the target (i.e. the base point) vertically below the measuring device can be seen through the centering telescope 100, so that the centering operation can be carried out. After the centering operation, similarly to each of the embodiments described above, the telescope 22 is rotated downward, and a distance measurement is carried out using a light beam passing through the optical member 106, so that the instrument height is detected. Namely, the distance measuring light wave, emitted through the telescope 22, passes through the optical member 106 along the vertical axis J, so that a distance from the center O to the target (i.e. the base point) positioned below the measuring device is derived. Note that, in the distance measurement, a distance, corresponding to the thicknesses of the cover glasses 108 and 109 and the beam splitter 106*a*, should be taken into account.

Figure 17:
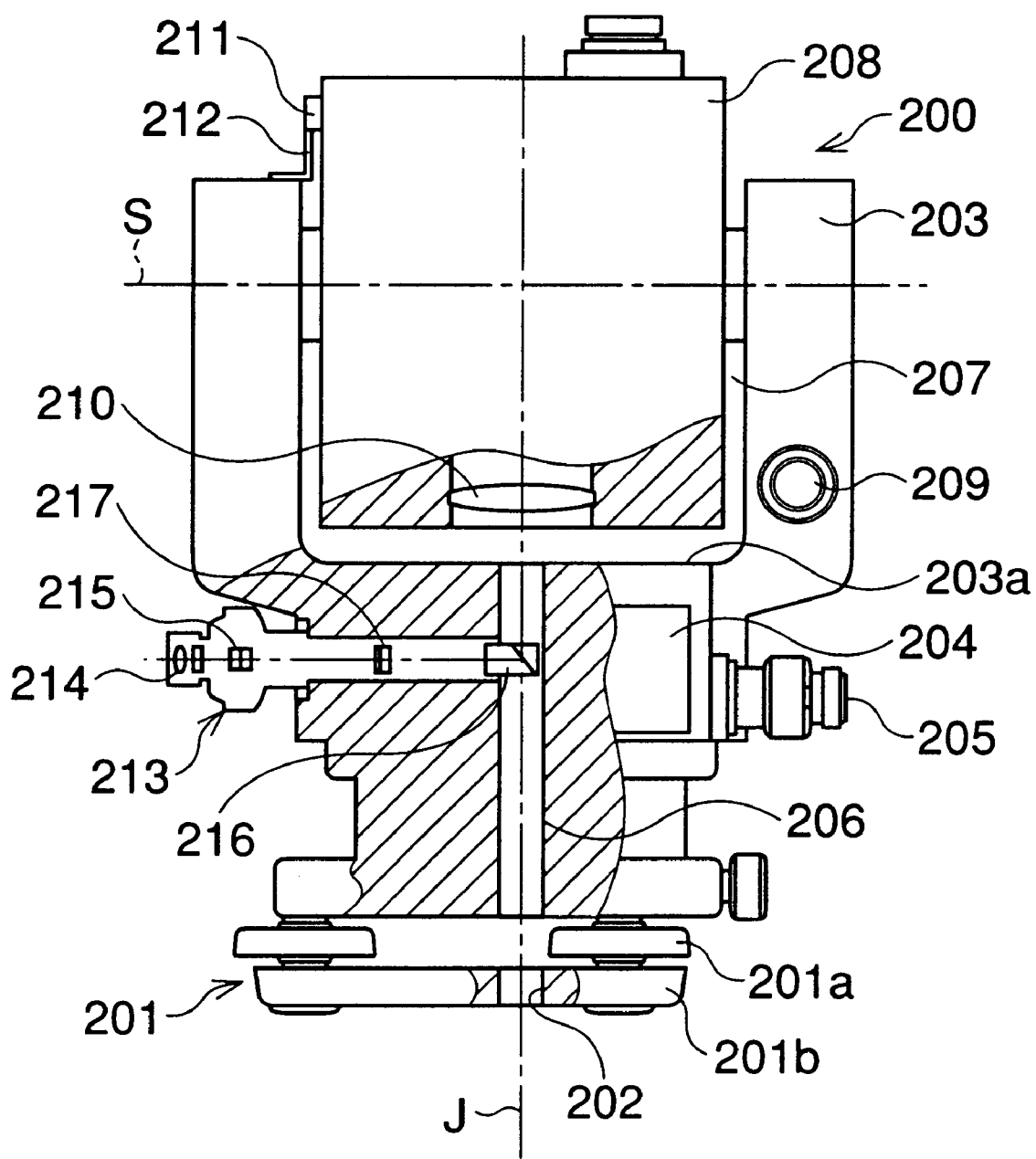
FIG. 17 is a partially sectioned front view showing a total station of a sixth embodiment of the present invention.
Figure 18:
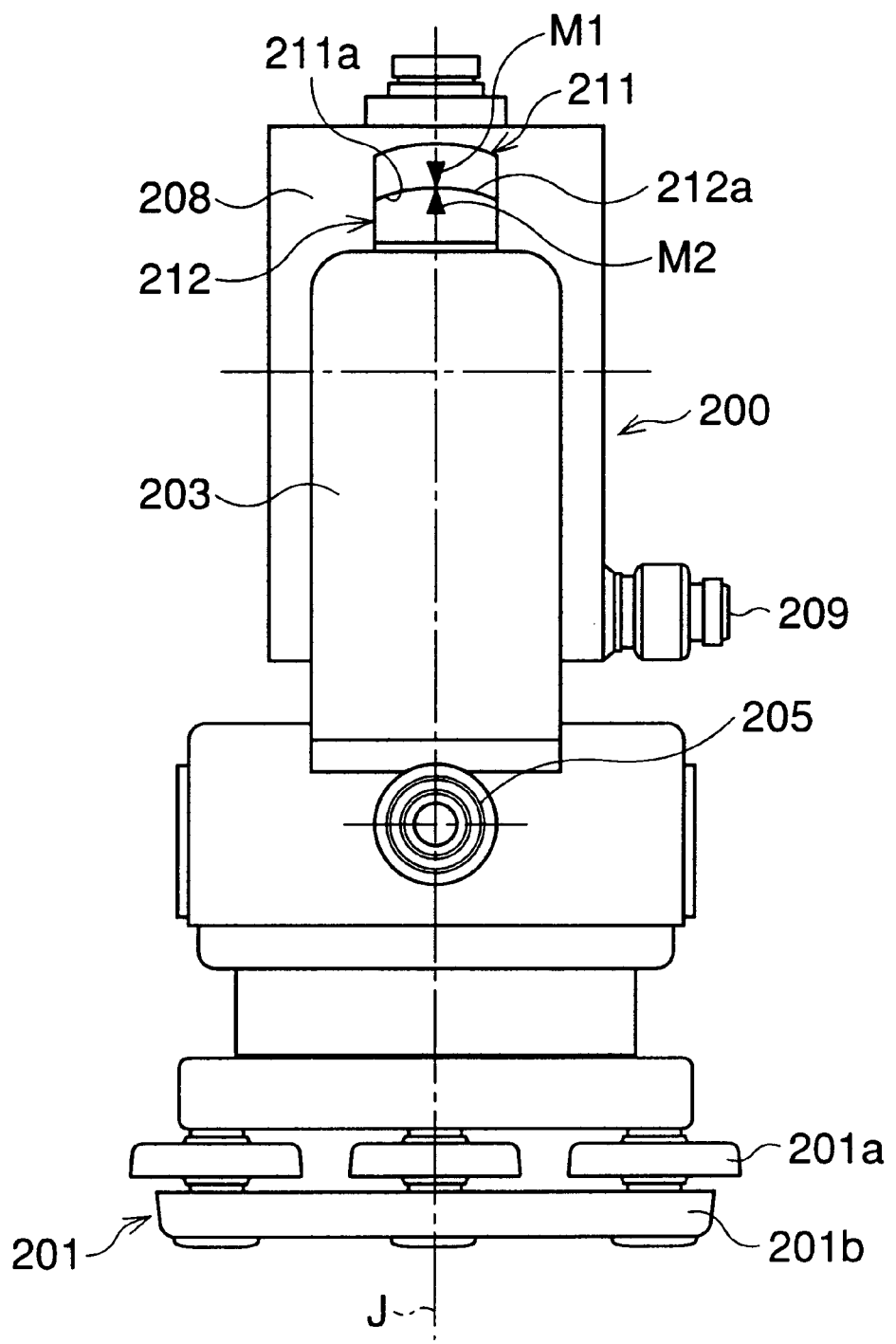
FIG. 18 is a side view showing the total station shown in FIG. 17.

FIGS. 17 and 18 show a sixth embodiment of the present invention, in which a distance measuring device is provided for detecting the instrument height.

Similarly to the total station of the first embodiment, the distance measuring device 200 is provided with a base 201, having a fixing plate 201*b* and horizontal adjusting members 201*a*. The fixing plate 201*b* is provided for fixing the distance measuring device 200 onto a tripod (not shown). Namely, by rotating the horizontal adjusting members 201*a* about the respective axes, the distance measuring device 200 can be adjusted about a horizontal plane. A threaded hole 202, in which a fixing screw used for connecting the distance measuring device to the tripod is threadingly fitted, is formed in the central portion of the fixing plate 201*b*.

The main body 203 disposed above the base 201 is rotatable about the vertical axis J passing through the center of the distance measuring device 200, by operating an adjusting screw 205. An indicating unit 204 is provided at a lower portion of the main body 203 to indicate various information regarding the distance measuring device 200. A microcomputer (not shown) is provided in the main body 203 to control devices provided in the distance measuring device 200 and to carry out various calculations. A light-passing hole 206 is formed in the main body 203, and penetrates from the center of an upper surface 203*a* through to a bottom surface of the main body 203. The light-passing hole 206 faces the threaded hole 202.

A distance measuring unit 208 is provided in a telescope holding space 207, formed in the main body 203. The distance measuring unit 208 is rotatably supported by the main body 203 so as to rotate about a horizontal axis S. The distance measuring unit 208 is rotated and fixed at a predetermined position by operating an adjusting screw 209. The distance measuring unit 208 is provided with a distance measuring optical system (i.e. telescope) 210.

The distance measuring device 200 has a positioning mechanism provided for determining whether or not the optical axis of a distance measuring optical system 210 is coincident with the vertical axis J. The positioning mechanism has a first index member 211, which is fixed on a side surface of the distance measuring unit 208, and a second index member 212, which is fixed on an upper surface of the main body 203. A lower surface 211*a* of the first index member 211 is a concave cylindrical surface, the center of curvature of which is on the horizontal axis S, and an upper surface 212*a* of the second index member 212 is a convex cylindrical surface, the center of curvature of which is on the horizontal axis S. These surfaces 211*a* and 212*a* are in slidable contact with each other.

A first mark M1, which is an arrow in the direction of the second index member 212, is formed on a surface of the first index member 211, and a second mark M2, which is an arrow in the direction of the first index member 211, is formed on a surface of the second index member 212. These marks M1 and M2 face each other when the distance measuring optical system 210 is coincident with the vertical axis J. Namely, the marks M1 and M2 are provided because the distance measuring device 200 is usually not provided with an altitude-horizontal graduated circle.

The distance measuring unit 208 has a bubble tube (not shown), which is constructed in such a manner that the bubble is positioned at the center of the bubble tube when the distance measuring device 200 is set in a horizontal state.

The distance measuring unit 208 has a centering telescope 213. The centering telescope 213 has a construction similar to the centering telescope 100 (see FIG. 16) of the fifth embodiment, and has an eyepiece 214, a centering focusing glass 215, an optical member 216 and an object lens 217.

Therefore, in the sixth embodiment, first, the target (i.e. the base point) located vertically below the distance measuring unit 208 is sighted through the centering telescope 213, so that the centering operation is carried out. Then, the distance measuring unit 208 is directed downward such that the marks M1 and M2 align with each other, and a distance measurement is carried out to sense the instrument height. Namely, according to the sixth embodiment, the same effect as that of the fifth embodiment can be obtained.

Figure 19:
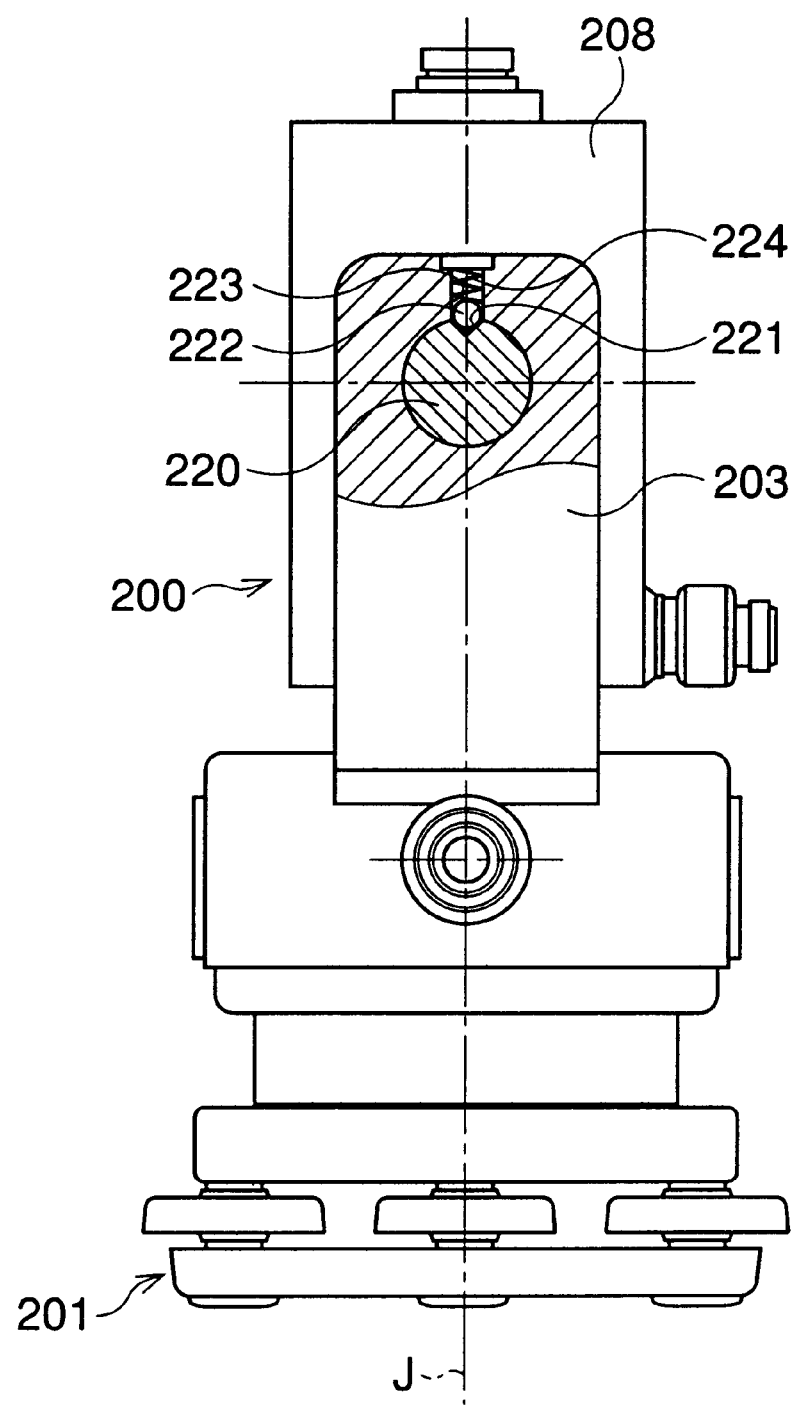
FIG. 19 is a partially sectioned side view showing a total station of a seventh embodiment of the present invention.

FIG. 19 shows a seventh embodiment of the present invention. In the seventh embodiment, in comparison with the sixth embodiment, a positioning mechanism for adjusting the optical axis of the distance measuring optical system (not shown) of the distance measuring unit 208 to the vertical axis J, has a different construction, with the other constructions being the same.

Namely, in the seventh embodiment, a conical recess 221 is formed on a rotational shaft 220 which is integrally formed with the distance measuring unit 208 and is rotatably supported by the main body 203. A ball 222, engagable with the recess 221, is provided in the main body 203. The ball 222 is housed in a housing hole 223 formed in the main body 203, and a spring 224 urging the ball 222 to the recess 221 is located in the housing hole 223.

The recess 221 is formed in such a manner that the ball 222 is engaged with the recess 221 when the optical axis of the distance measuring optical system is coincident with the vertical axis J. Therefore, according to the seventh embodiment, an operation, in which the distance measuring unit 208 is rotated vertically downward, is simplified.

Figure 20:
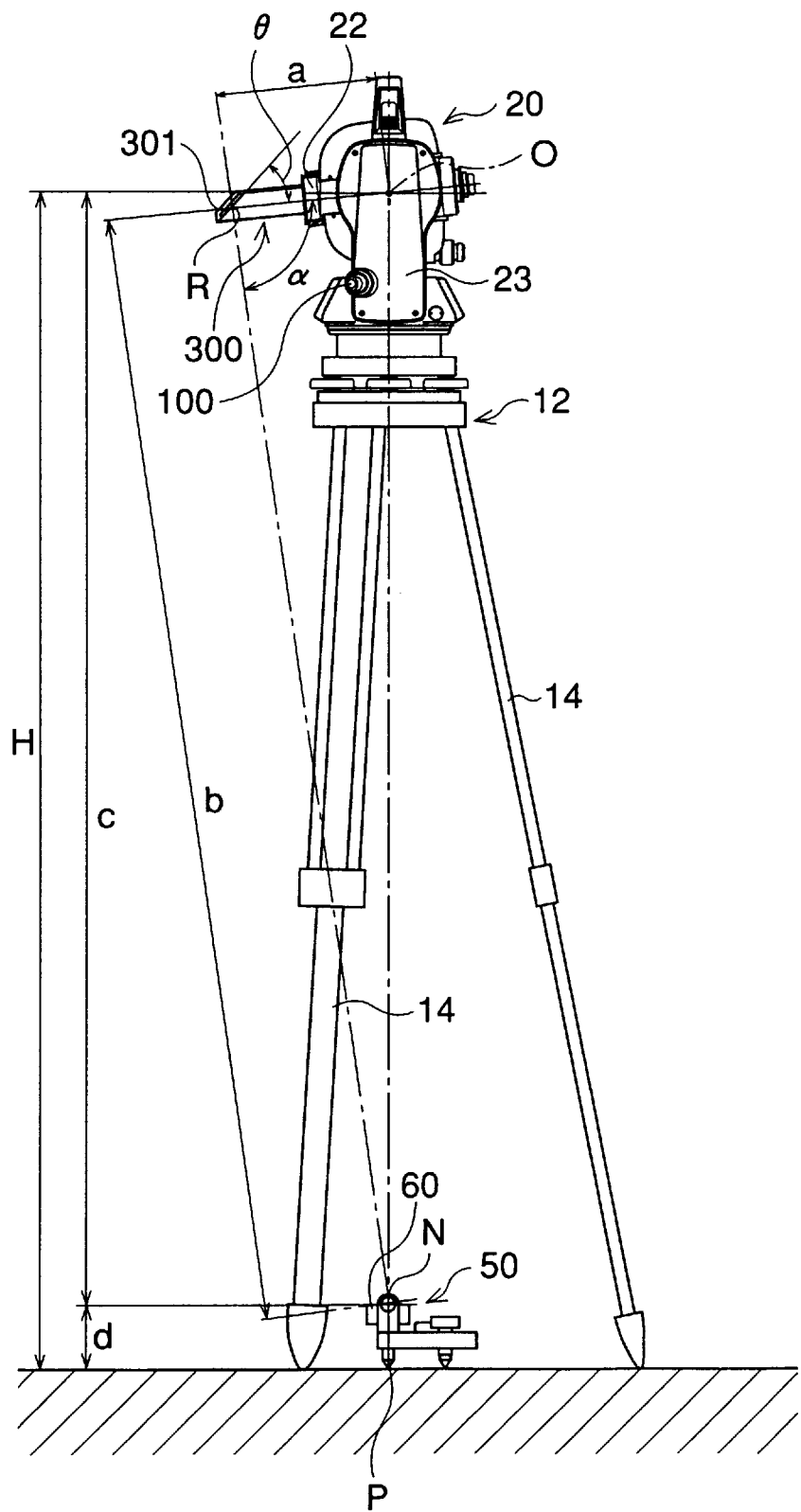
FIG. 20 is a partially sectioned side view showing the total station of an eighth embodiment connected to a tripod.

FIG. 20 shows an eighth embodiment of the present invention. In the eighth embodiment, the total station 20, which is connected to the tripod 12, is provided with a reflection mirror unit 300, and the prism unit 50, having the corner cube prism 60, is disposed at the base point (i.e. target point) P beneath the total station 20. The total station 20 does not have the threaded hole, which is provided in the base of the first through seventh embodiments. The centering telescope 100, for which the center of the total station 20 can be positioned above the base point, is provided in the main body 23. The other constructions are basically the same as those of the first embodiment.

The reflection mirror unit 300 is attached to a front surface of the telescope 22, which is rotatable about the horizontal axis, i.e. the center O of the total station 20. The reflection mirror unit 300 has a first reflecting member, i.e. a reflection mirror 301, at a portion separated from the center O of the telescope 22 by a distance "a", so that the optical axis of the telescope 22 is bent by a predetermined angle α.

The distance measuring light wave, emitted from the telescope 22, is reflected downward by the reflection mirror 301, through the angle of deviation α, to enter the corner cube prism 60 of the prism unit 50, as shown by a chained line in FIG. 20. The distance measuring light wave is reflected by the corner cube prism 60 back to the telescope 22. Thus, the distance L, from the center O of the total station 20 to the corner cube prism 60 via the reflection mirror 301, is detected by the total station 20 which is an electronic distance meter.

Figure 21:
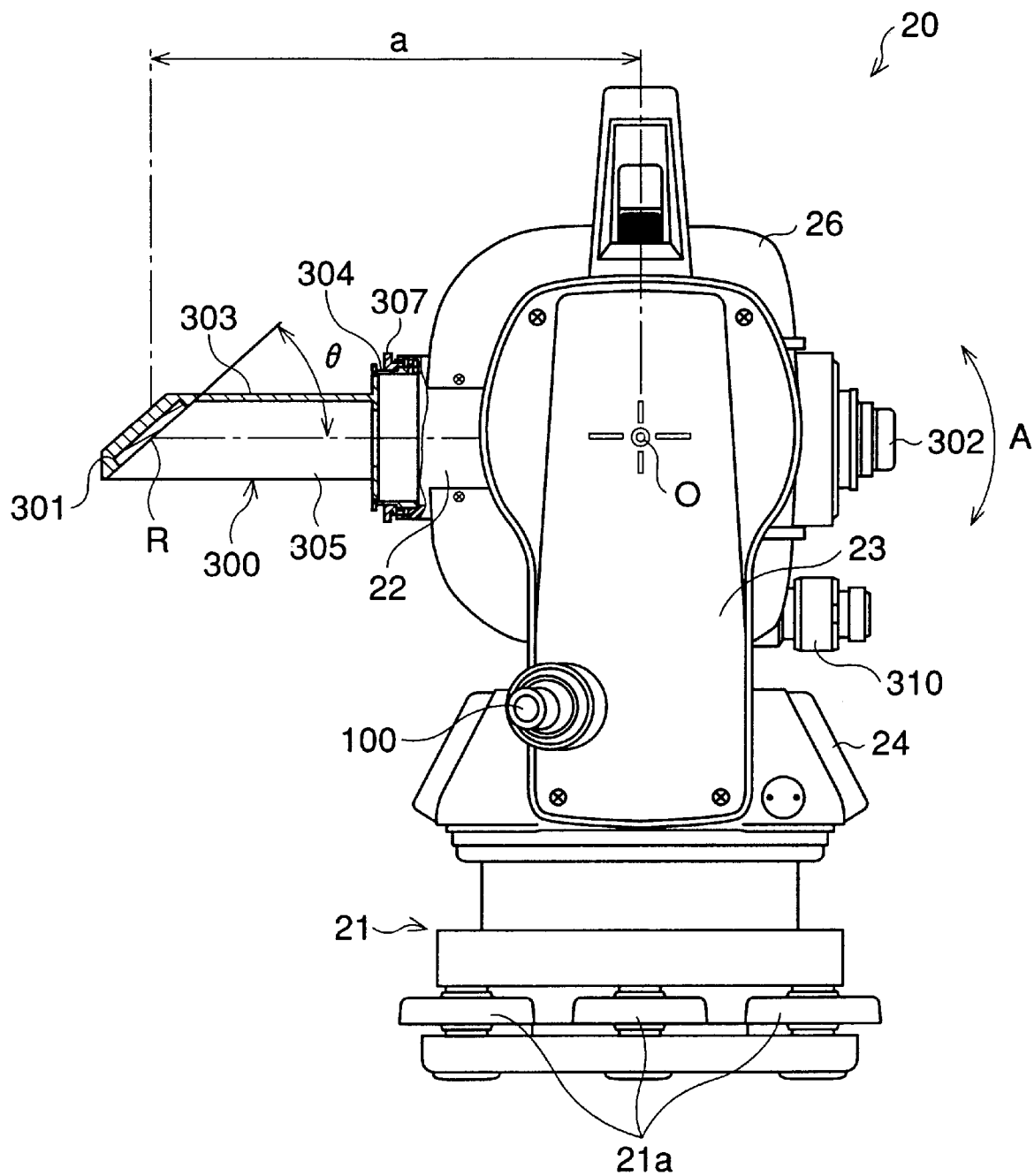
FIG. 21 is a partially sectioned side view of the total station shown in FIG. 20.
Figure 22:
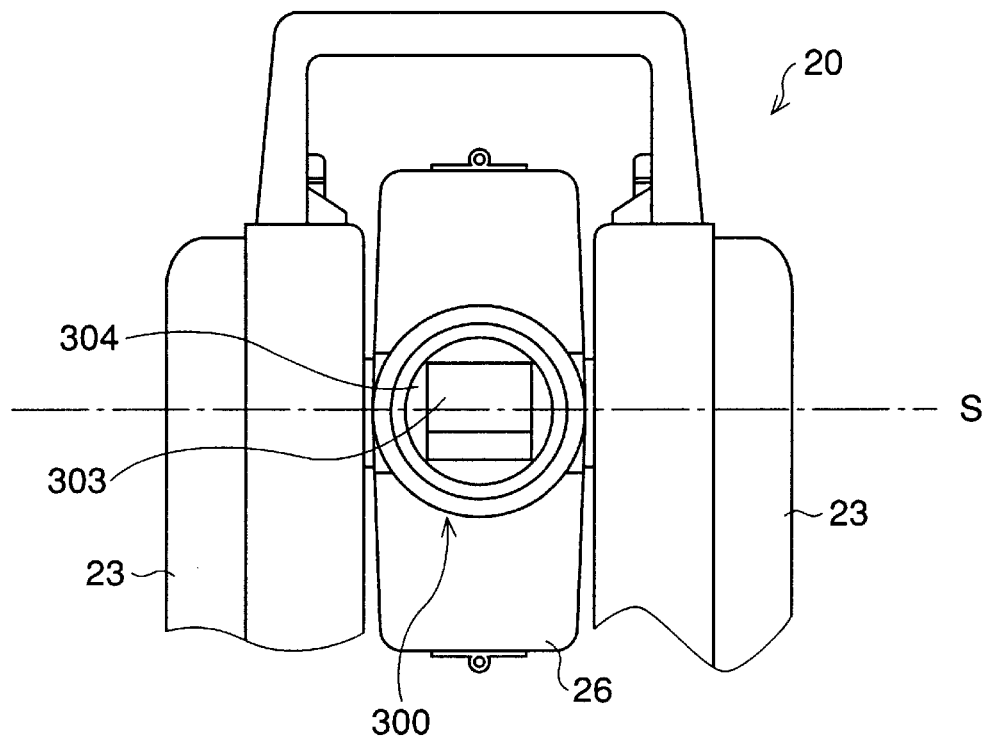
FIG. 22 is a front view showing a reflection mirror unit, according to the eighth embodiment.
Figure 23:
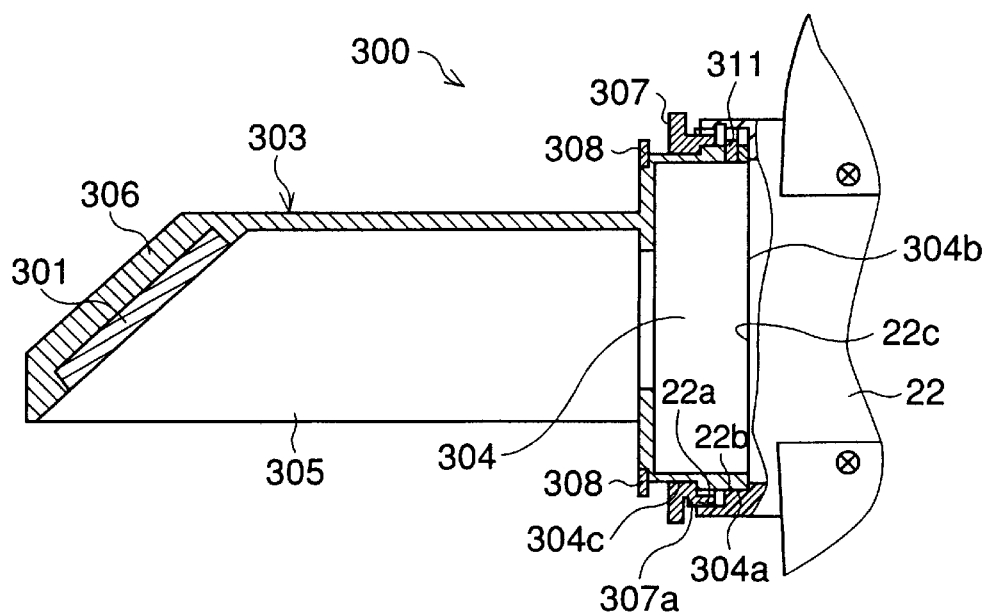
FIG. 23 is a sectional view showing the reflection mirror unit of FIG. 22.

FIG. 21 is a side view of the total station 20 in which the reflection mirror unit 300 is provided. FIG. 22 is a front view showing the reflection mirror unit 300, and FIG. 23 is an enlarged sectional view of the reflection mirror unit 300. Note that the chained line S, in FIG. 22, indicates the horizontal axis passing through the center O.

The telescope unit 26, to which the telescope 22 is provided, is pivoted by the main body 23 about the horizontal axis S in a direction shown by an arrow A. The telescope unit 26 and the telescope 22 are rotated as one body by operating the adjusting screw 310. An eyepiece lens 302 is detachably attached to an end portion of the telescope 22, and the reflection mirror unit 300 is connected to the other end portion of the telescope 22. A transparent focusing glass (not shown) is provided in the telescope 22, and cross-hairs are formed on the focusing glass in order to recognize the center of the focusing glass.

The reflection mirror unit 300 has a rectangular parallelepiped hollow column 303 and a cylindrical portion 304, which is connected to an end of the hollow column 303 and is positioned opposite to the reflection mirror 301. The hollow column 303 is extended in a horizontal direction, and the bottom of the column 303 is open to form an opening 305. The hollow column 303 has a U-shaped section perpendicular to the longitudinal axis thereof. The center of the cylindrical portion 304 is positioned on the center of the U-shaped section of the hollow column 303. The longitudinal axis of the hollow column 303 and the axis of the cylindrical portion 304 are approximately coincident with the optical axis of the telescope. The radius of the cylindrical portion 304 is greater than the diagonal length of the U-shaped section of the hollow column 303.

The hollow column 303 has an inclined plate 306 at the opposite end to the cylindrical portion 304. The reflection mirror 301 is attached to an inner surface of the inclined plate 306, at an angle θ with respect to the optical axis of the telescope 22. This angle θ can be set according to necessity. The relationship between the angles θ and α are indicated by the following formula (2)

$$\alpha = \pi - 2\theta (0 < \theta < \pi/2) \tag{2}$$

A tip portion of the telescope 22 has a threaded inner wall 22a, a smooth inner wall 22b and an abutment wall 22c. The threaded inner wall 22a is positioned close to the end face of the tip portion, and has a diameter greater than that of the smooth inner wall 22b. The smooth inner wall 22b is formed between the threaded inner wall 22a and the abutment wall 22c, which is perpendicular to the inner walls 22a and 22b. The cylindrical portion 304 of the reflection mirror unit 300 is located against the telescope 22 in such a manner that a first outer surface 304a of the cylindrical portion 304 is fitted in the smooth inner wall 22b and an end 304b of the cylindrical portion 304 is in contact with the abutment wall 22c, so that the position of the reflection mirror unit 300 in the optical axis is fixed.

A fixing ring 307 is provided between the cylindrical portion 304 and the tip portion of the telescope 22, so that the reflection mirror unit 300 is fixed to the telescope 22. An inner surface of the fixing ring 307 is engaged with a second outer surface 304c of the cylindrical portion 304, and a threaded outer surface 307a of the fixing ring 307 is engaged with the threaded inner wall 22a. A stopper ring 308 is fitted on the cylindrical portion 304 to prevent the fixing ring 307 from becoming separated from the cylindrical portion 304.

Figure 24:
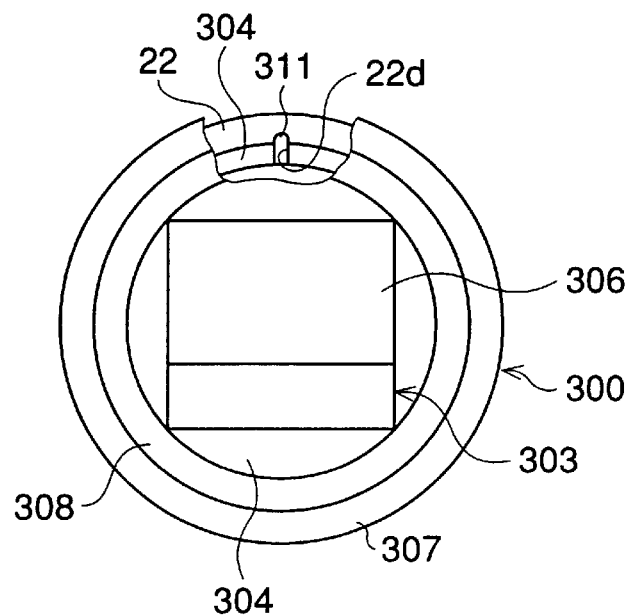
FIG. 24 is a partially sectioned front view showing the reflection mirror unit of FIG. 22.

FIG. 24 shows a partially sectioned reflection mirror unit 300. A positioning pin 311 is fixed on the cylindrical portion 304. The abutment wall 22c (see FIG. 23) of the telescope 22 has a pin groove 22d, with which the positioning pin 311 is engaged, so that a rotational position of the reflection mirror 301 is fixed.

Figure 25:
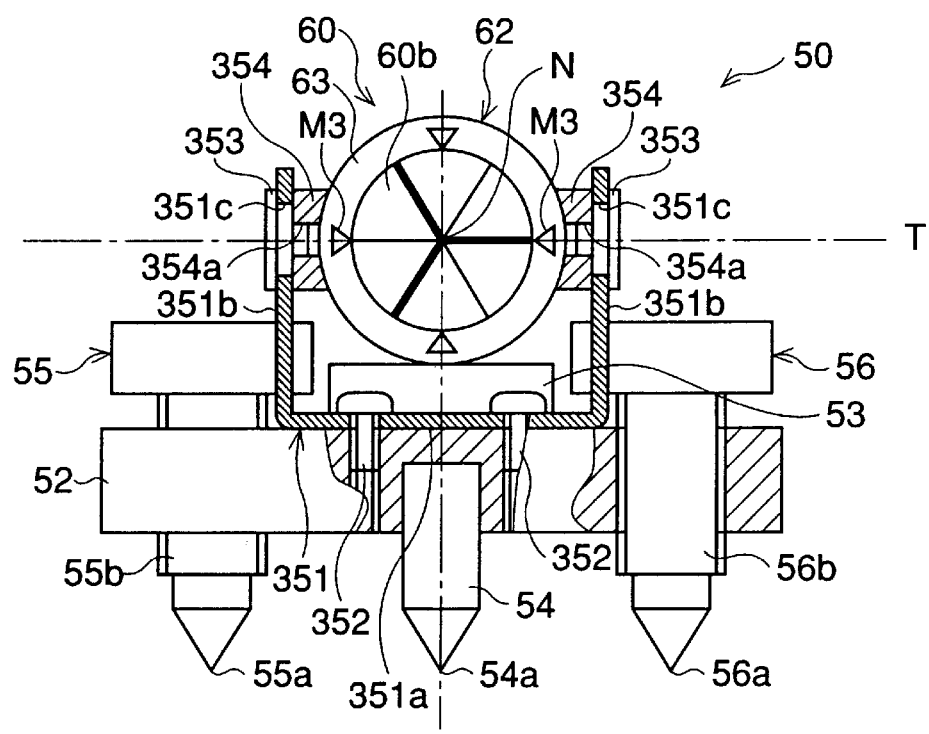
FIG. 25 is a front view showing the prism unit provided in the eighth embodiment.
Figure 26:
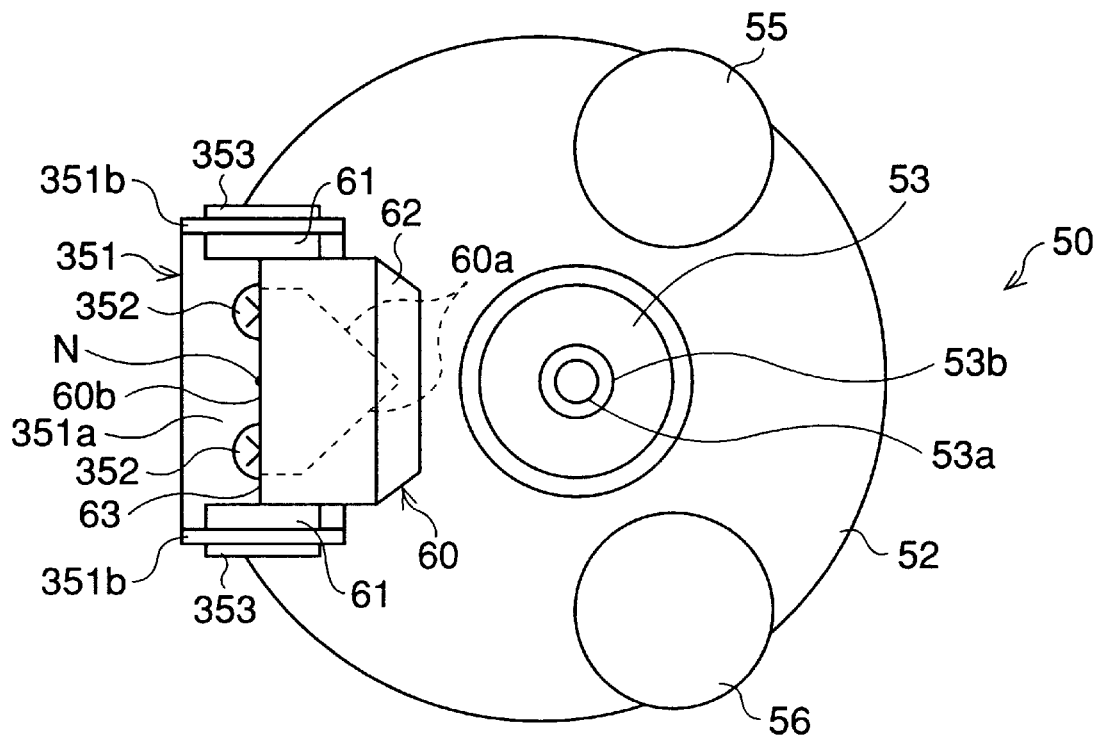
FIG. 26 is a plan view showing the prism unit shown in FIG. 25.
Figure 27:
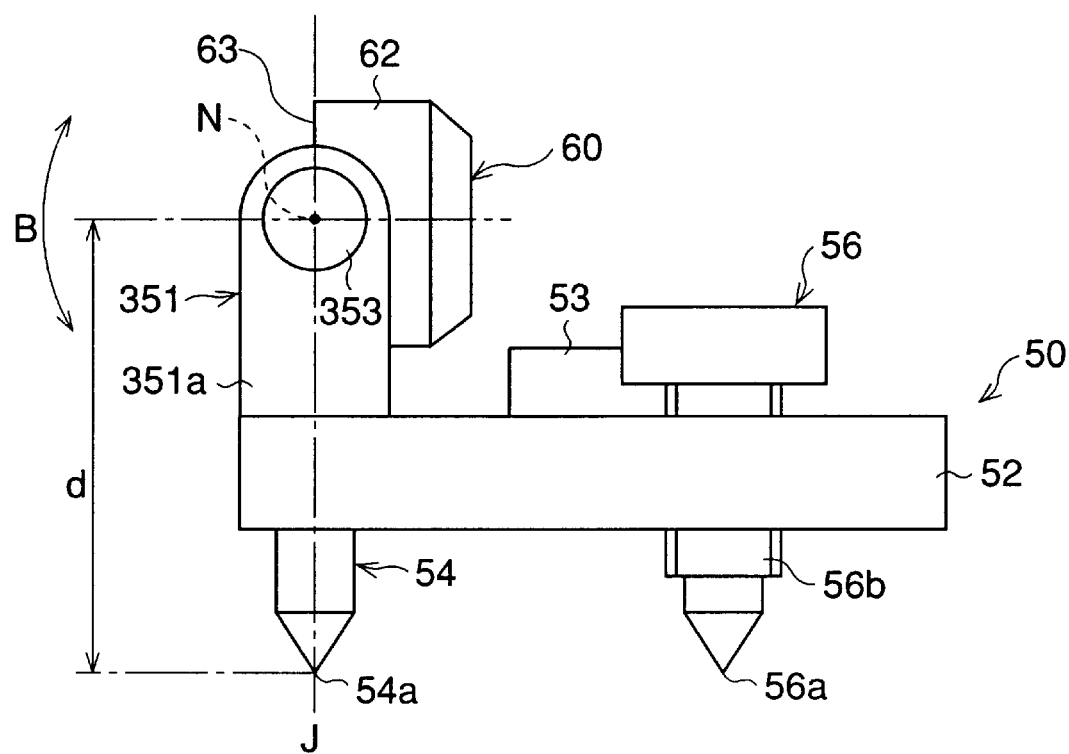
FIG. 27 is a side view showing the prism unit shown in FIG. 25.

With reference to FIGS. 25 through 27, a construction of the prism unit 50 provided in the eighth embodiment is described.

The prism unit 50 has a disk-shaped leveling board 52, on which a prism holder 351 is provided. The prism holder 351 has a base plate 351a and support plates 351b extending upward from both ends of the base plate 351a. The base plate 351a is fixed on the leveling board 52 by screws 352.

The corner cube prism 60 is supported by the support plates 351b to rotate about a horizontal rotational axis T (a direction shown by an arrow B in FIG. 27). Namely, a holder hole 351c is formed in each of the support plates 351b, and a prism support pin 353 is inserted into each of the holder holes 351c, so as to project to the inside of the prism holder 50. A prism cover 62, in which the corner cube prism 60 is housed, has lugs 354 on the outer surface thereof. Each of the lugs 354 has a hole 354a, in which the prism support pin 353 is inserted, enabling the prism cover 62 and the corner cube prism 60 to be rotated about the prism support pins 353, i.e. the rotational axis T.

As described previously with reference to FIG. 9, when viewing from the prism plane 60b of the corner cube prism 60, the three sides and the images of the sides appear to intersect each other on the prism plane 60b. The center N of the corner cube prism 60 is the point of intersection on the prism plane 60b, and the rotational axis T passes through the center N.

Marks M3 are formed on a front surface 63 of the prism cover 62, so that each of the sides of the corner cube prism 60 can be adjusted to intersect the rotational axis T. Namely, by recognizing whether or not the marks M3 are coincident with the sides, it can be determined whether or not the front surface 63, i.e. the prism plane 60b, is perpendicular to the optical axis of the telescope 22. By positioning the sides onto the marks M3, a measurement result can be obtained with a higher accuracy.

The other constructions of the prism unit 50 are the same as those of the prism unit 50 provided in the first embodiment and shown in FIGS. 9 and 10. Note that, in the eighth embodiment, the base pin 54 is provided in such a manner that the axis thereof passes through the center N of the corner cube prism 60, and the tip portion 54a of the base pin 54 is placed on the base point P (see FIG. 20). The prism height "d" is defined by a distance from the tip portion 54a to the center N.

An operation of the eighth embodiment will be described below. First, the total station 20, attached to the tripod 12, is placed over the base point P, and a leveling and a sighting of the total station 20 is carried out, as described below. Note that, in the microcomputer, "a", "d" and "θ" have been stored as known data. The prism constant, by which the measured data is corrected, is determined based on the prism center N.

The cylindrical portion 304 of the reflection mirror unit 300 is fitted to the inner wall 22b of the telescope 22, so that the reflection mirror unit 300 is positioned and adjusted on the optical axis of the telescope 22. Then, the refelction mirror unit 300 is rotated about the optical axis until the positioning pin 311 is engaged with the pin groove 22d. Thus, the rotational position of the reflection mirror 301 is fixed, so that the reflection mirror 301 can reflect a light beam, outputted by the telescope 22, onto the corner cube prism 60.

Then, the fixing ring 307 is threaded into the threaded inner wall 22a, so that the end of the cylindrical portion 304 comes into contact with the abuttment wall 22c. Thus, the distance "a" from the center O of the total station 20 to a point R of the reflection mirror 301 is fixed. The prism unit 50 is placed in such a manner that the tip portion 54a of the base pin 54 is positioned on the base point P. The leveling pins 55 and 56 are rotated while the bubble 53a is kept at the center of the circular mark 53b of the bubble tube 53, so that the leveling board 52 is adjusted such that the axis J becomes vertical.

Figure 28:
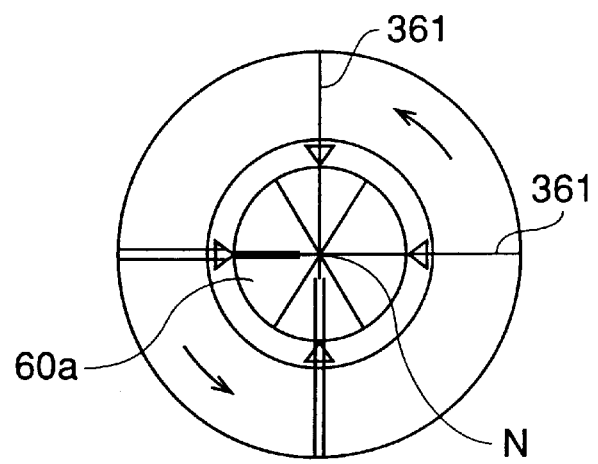
FIG. 28 is a view showing an image which can be seen through the telescope when detecting the instrument height, according to the eighth embodiment.

FIG. 28 shows an image observed through the telescope 22 when sighting the corner cube prism 60. The corner cube prism 60 is rotated about the rotational axis T in such a manner that the front surface 63 roughly faces the reflection mirror 301. The telescope 22 is rotated about the horizontal axis and the vertical axis, and then, by observing through the telescope 22, cross-hairs 361, formed on the focusing glass of the telescope 22, are adjusted onto the center N of the corner cube prism 60. After this adjusting operation is completed, a distance measurement is carried out so that a distance L from the center O of the total station 20 to the center N of the corner cube prism 60, via the point R of the reflection mirror 301, is obtained.

Figure 29:
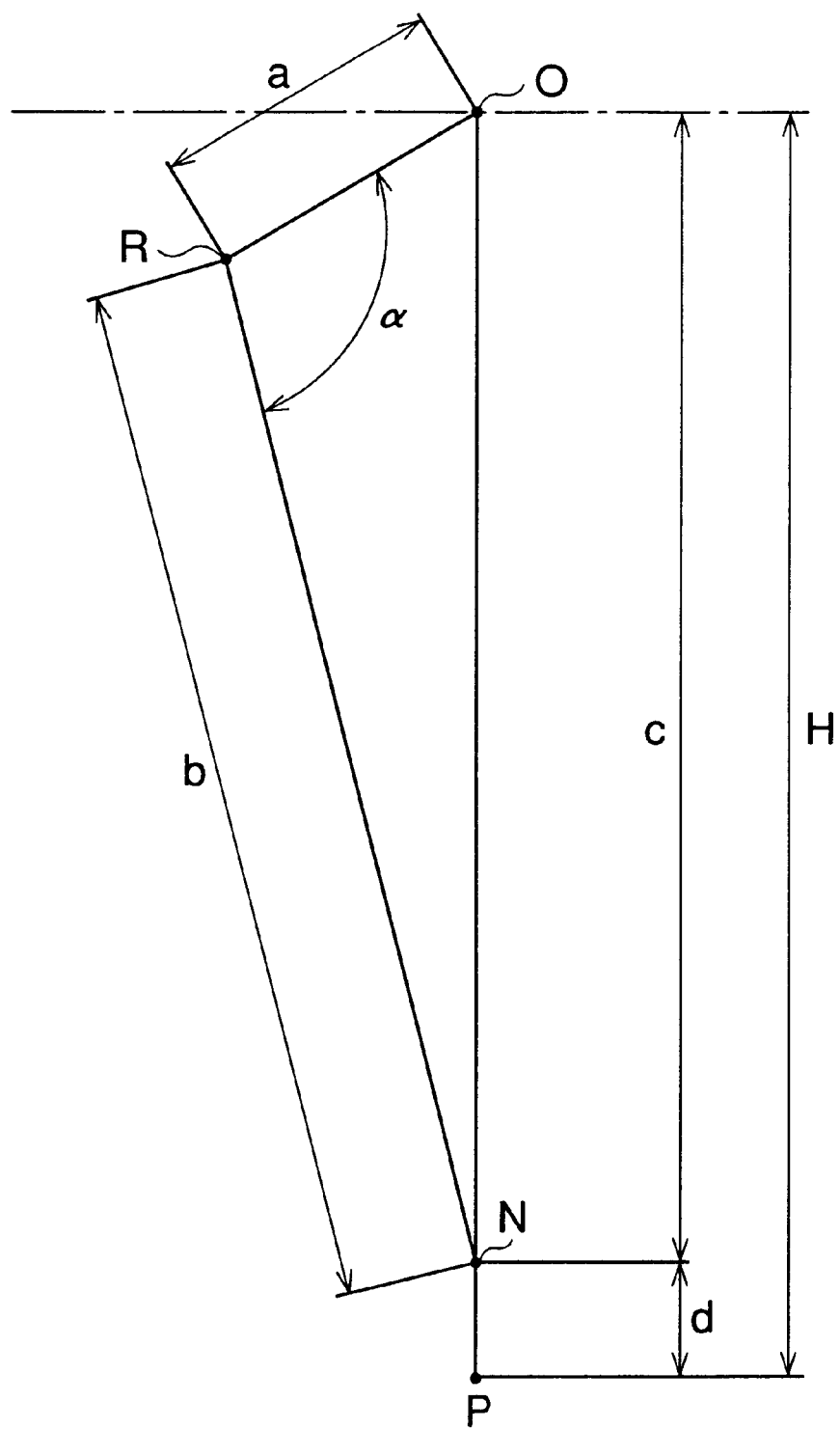
FIG. 29 is a view showing a positional relationship between the points for obtaining the instrument height, according to the eighth embodiment.

FIG. 29 shows a positional relationship between the points O, R and N. As indicated by the equation (3), a length of the side ON is obtained from the side OR, the side RN and the angle α, using trigonometry, and the instrument height H is obtained by the sum of the side ON and the given straight line NP. Note that, when the base point P is recessed or projected from the ground level, the instrument height H is corrected by the amount of the recess or projection.

$$H=d+C$$
$$=d+(a^2+b^2-2ab\cos\alpha)^{1/2} \quad (3)$$

wherein b=L−a

This calculation is carried out by the microcomputer housed in the main body 23, for example, and indicated by the indicating unit 24.

According to the eighth embodiment, since the prism unit 50, the height of which is already known, is placed on the base point, and the distance measurement is carried out by the telescope 22 provided in the total station 20, the exact instrument height can be easily obtained. On the other hand, in a conventional device, since a tape measure is used, a load is imparted to one side of the total station if the tape measure is pulled, so that the total station may be moved, tilted or toppled. Conversely, in the eighth embodiment, this is removed.

Figure 30:
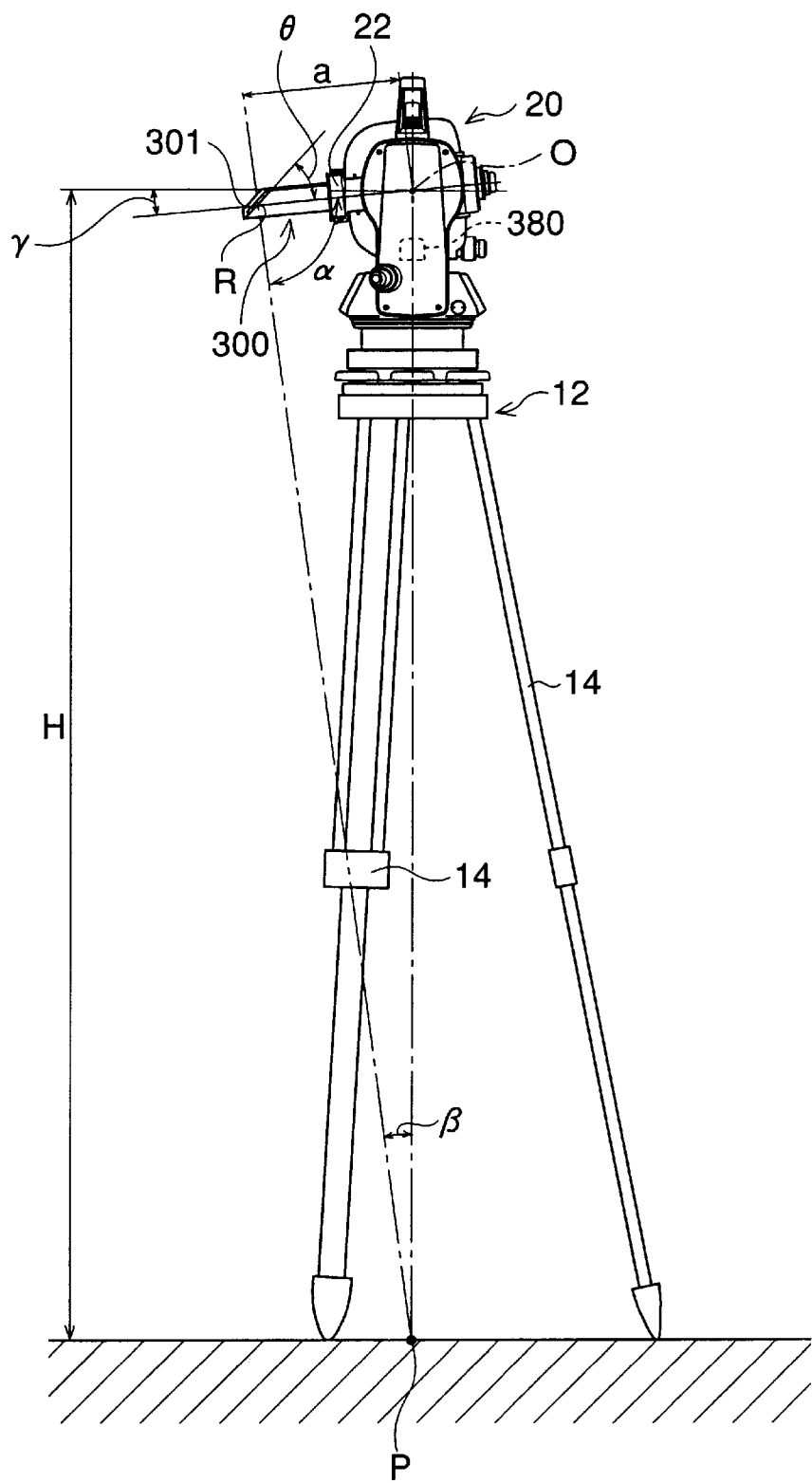
FIG. 30 is a partially sectioned side view showing the total station of a ninth embodiment connected to a tripod.

FIG. 30 shows a ninth embodiment of the present invention. In the ninth embodiment, similarly to the eighth embodiment, the reflection mirror unit 300 is attached to a front surface of the telescope 22, which is rotatable about the horizontal axis, i.e. the center O of the total station 20. The reflection mirror unit 300 has the reflection mirror 301, at a portion separated from the center O by a distance "a", so that the optical axis of the telescope 22 is bent through a predetermined angle α. An angle measurement sensor 380 is provided in the main body 23, so that an angle γ, by which the telescope 22 is rotated about the horizontal axis passing through the center O (see FIG. 32), is sensed. The angle measurement sensor 380 is a known rotary encoder, and the detected angle γ is stored in the microcomputer provided in the main body 23 as a digital data.

On the other hand, different from the eighth embodiment, the total station 20 is not constructed in such a manner that an infrared beam is emitted through the telescope 22, and the prism unit is not provided beneath the total station 20. Note that the relationship between the angles θ and α are indicated by equation (2), similarly to the eighth embodiment.

An operation of the ninth embodiment will be described below. The total station 20, attached to the tripod 12, is placed over the base point P. The reflection mirror unit 300 is attached to the telescope 22, in a similar way as that of the eighth embodiment. In the microcomputer, a distance "a" from the center O to the point R on the reflection mirror 301, and an angle "θ" have been stored as known data.

Figure 31:
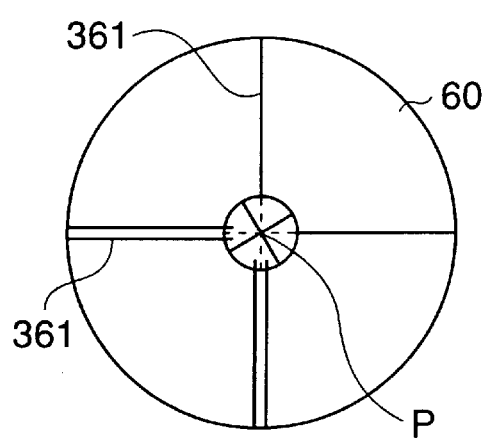
FIG. 31 is a view showing an image which can be seen through the telescope when sighting the base point, according to the ninth embodiment.

FIG. 31 shows an image observed through the telescope 22 when sighting the base point P. The telescope 22 is rotated about the horizontal axis and the vertical axis, and then, by observing through the telescope 22, the cross-hairs 361, formed on the focusing glass of the telescope 22, are adjusted onto the base point P. After this adjusting operation is completed, an angle measurement is carried out so that the angle γ of the reflection mirror 301, about the horizontal axis passing through the center O of the total station 20, is obtained. For example, the angle γ is positive in a counter-clockwise direction, and is zero when the optical axis of the telescope 22 is horizontal.

Figure 32:
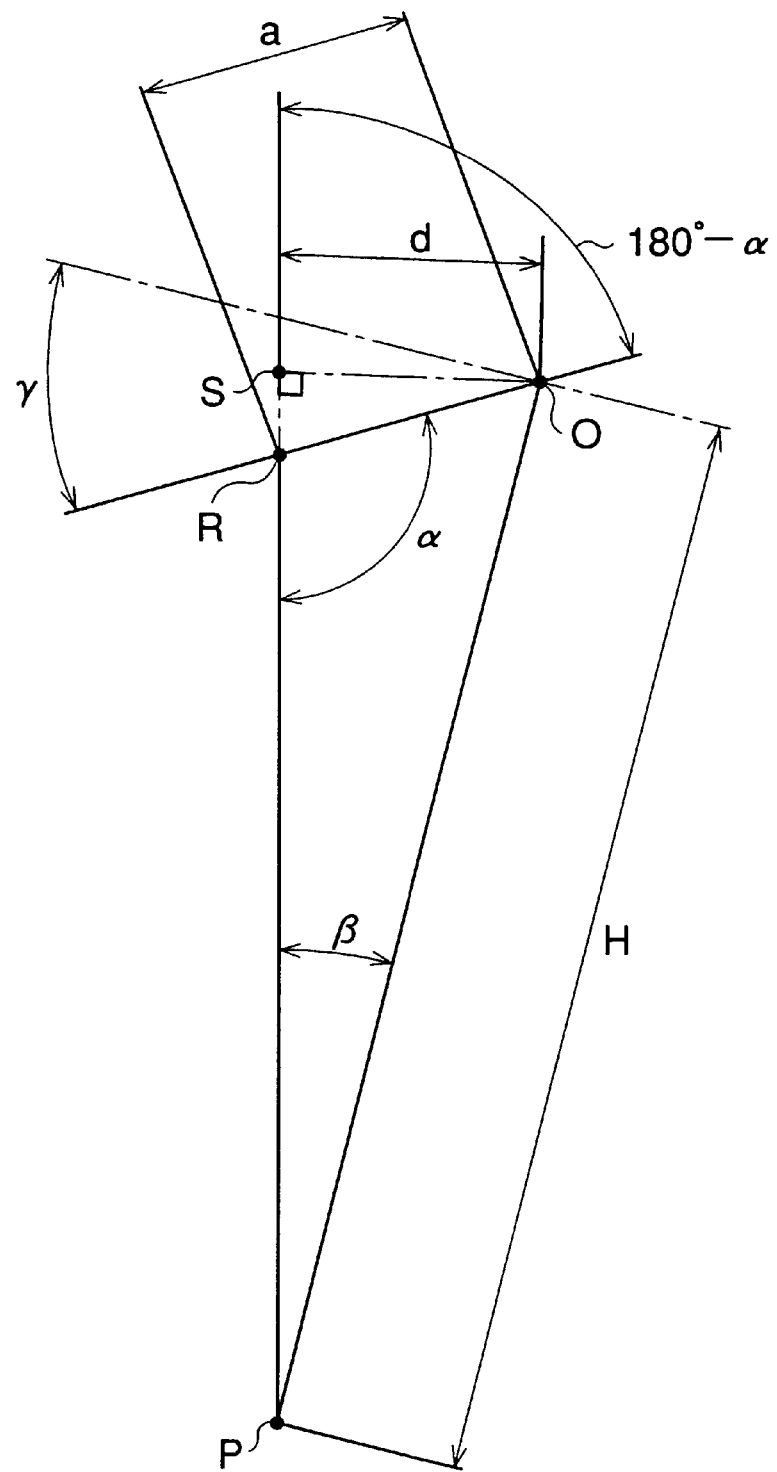
FIG. 32 is a view showing a positional relationship between the points for obtaining the instrument height, according to the ninth embodiment.

FIG. 32 shows a positional relationship of the points O, P and R for obtaining the instrument height. Equation (4) is given with respect to the length "d" of the given straight line OS, in accordance with the trigonometry, wherein OS is the straight line passing through the center O and is normal to the straight line RP.

$$d = a\ \sin(\pi - \alpha)$$
$$= H \sin(\beta) \quad (4)$$

wherein $\beta = \pi/2 - \alpha + \gamma$

Equation (4) is transformed and equation (2) is substituted into transformed equation (4), so that equation (5) is obtained.

$$H = a\ \sin(\pi - \alpha)/\sin \beta$$
$$= a\ \sin(2\theta)/\sin(\gamma + 2\theta - \pi/2) \quad (5)$$

From this equation (5), the length of the side OP, i.e. the instrument height H, is obtained. Note that, when the base point P is recessed or projected from the ground level, the instrument height H is corrected by the amount of the recess or projection. The calculation is carried out by the microcomputer housed in the main body 23, for example, and indicated by the indicating unit 24.

As described above, in the ninth embodiment, since the angle γ is detected using the angle measurement sensor 380 provided in the main body 32, the exact instrument height can be easily obtained, and the same effect as that of the eighth embodiment can be obtained.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 9-23322 and 9-23323 (filed on Jan. 22, 1997), No. 9-52427 (filed on Feb. 20, 1997) and Unknown Number (filed on Dec. 26, 1997) which are expressly incorporated herein, by reference, in their entirety.

We claim:

1. A measurement device comprising:
   a main body;
   a telescope supported by said main body to rotate about a horizontal axis of said main body;
   a radiation mechanism radiating a distance measuring light wave, which is output from said measurement device through said telescope;
   a directing mechanism directing said distance measuring light wave to a target point which is located at a position vertically under said main body, said directing mechanism comprises a light-passing hole through which said distance measuring light wave passes, and which extends in a vertical direction; and
   a measuring processor measuring a distance from a predetermined point of said measurement device to said target point, using said distance measuring light wave directed to said target point.

2. A measurement device according to claim 1, wherein said main body is rotatable about a vertical axis, which passes through said predetermined point, and said horizontal axis, said predetermined point being the center of said measurement device.

3. A measurement device according to claim 1, wherein said light-passing hole has mouths at the upmost position and the lowest position thereof, respectively, each of said mouths being provided with a transparent member.

4. A measurement device according to claim 1, wherein said measuring processor measures said distance by sensing a light beam, generated by said distance measuring light wave, which is reflected by said target point.

5. A measurement device according to claim 1, further comprising a main reflecting member, which is disposed at said target point, so that said light wave outputted by said radiating mechanism is reflected.

6. A measurement device according to claim 5, wherein said main reflecting member is a corner cube prism.

7. A measurement device according to claim 5, further comprising an obtaining processor obtaining an instrument height of said measurement device based on information related to a position where said main reflecting member is disposed and said distance measured by said measuring processor.

8. A measurement device according to claim 7, wherein said obtaining processor obtains said instrument height by adding a height of a position where said main reflecting member is disposed to said distance measured by said measuring processor.

9. A measurement device according to claim 7, further comprising a microcomputer calculating said instrument height, and an indicating unit indicating a numerical value of said instrument height.

10. A measurement device according to claim 7, wherein said instrument height is used as a data for measurement.

11. A measurement device according to claim 1, further comprising an altitude graduated circle for measuring an angle of said telescope about said horizontal axis.

12. A measurement device according to claim 1, further comprising a positioning mechanism for determining whether or not said telescope is coincident with said vertical axis.

13. A measurement device according to claim 12, wherein said positioning mechanism has a first mark provided on said telescope and a second mark provided on said main body.

14. A measurement device according to claim 12, wherein said telescope has a rotational shaft, and said positioning mechanism has a recess formed in said rotational shaft enabling a ball to be engaged with said recess.

15. A measurement device comprising:

a main body;

a telescope supported by said main body to rotate about a horizontal axis of said main body;

a radiation mechanism radiating a distance measuring light wave, which is output from said measurement device through said telescope;

a directing mechanism directing said distance measuring light wave to a target point which is located at a position vertically under said main body; and a measuring processor measuring a distance from a predetermined point of said measurement device to said target point, using said distance measuring light wave directed to said target point, said main body comprising a handle in which a sub-reflecting member is provided, so that said telescope can be sighted through said sub-reflecting member when said telescope is directed vertically downward.

16. A measurement device according to claim 15, further comprising an optical member changing a magnification index, said optical member being disposed on an optical path of said telescope in such a manner that said optical member and said telescope are respectively disposed on opposite sides of said sub-reflecting member.

17. A measurement device according to claim 15, wherein said main body is rotatable about a vertical axis, which passes through said predetermined point, and said horizontal axis, said predetermined point being the center of said measurement device.

18. A measurement device according to claim 15, further comprising a main reflecting member, which is disposed at said target point, said light wave output by said radiating mechanism being reflected by said main reflecting member.

19. A measurement device according to claim 18, wherein said main reflecting member is a corner cube prism.

20. A measurement device comprising:

a main body;

a telescope supported by said main body to rotate about a horizontal axis of said main body;

a radiation mechanism radiating a distance measuring light wave, which is output from said measurement device through said telescope;

an optical member that changes a diameter of a luminous flux of said distance measuring light wave;

a directing mechanism directing said distance measuring light wave to a target point which is located at a position vertically under said main body; and a measuring processor measuring a distance from a predetermined point of said measurement device to said target point, using said distance measuring light wave directed to said target point.

21. A measurement device according to claim 20, further comprising a main reflecting member, which is disposed at said target point, said light wave output by said radiating mechanism being reflected by said main reflecting member.

22. A measurement device according to claim 21, wherein said main reflecting member is a corner cube prism.

23. A measurement device comprising:

a main body;

a telescope supported by said main body to rotate about a horizontal axis of said main body;

a radiation mechanism radiating a distance measuring light wave, which is output from said measurement device through said telescope;

an antireflection member preventing said distance measuring light wave from being reflected by a surface of said main body;

a directing mechanism directing said distance measuring light wave to a target point which is located at a position vertically under said main body; and a measuring processor measuring a distance from a predetermined point of said measurement device to said target point, using said distance measuring light wave directed to said target point.

24. A measurement device according to claim 23, wherein said antireflection member is treated with an antireflection process.

25. A measurement device according to claim 23, further comprising a main reflecting member, which is disposed at said target point, said light wave output by said radiating mechanism being reflected by said main reflecting member.

26. A measurement device according to claim 25, wherein said main reflecting member is a corner cube prism.

27. A measurement device comprising:

a main body;

a telescope supported by said main body to rotate about a horizontal axis of said main body;

a radiation mechanism radiating a distance measuring light wave, which is outputted from said measurement device through said telescope;

a centering telescope having an optical member, which reflects a visible light and transmits said distance measuring light wave;

a directing mechanism directing said distance measuring light wave to a target point which is located at a position vertically under said main body; and a measuring processor measuring a distance from a predetermined point of said measurement device to said target point, using said distance measuring light wave directed to said target point.

28. A measurement device according to claim 27, further comprising a main reflecting member, which is disposed at said target point, said light wave output by said radiating mechanism being reflected by said main reflecting member.

29. A measurement device according to claim 28, wherein said main reflecting member is a corner cube prism.

* * * * *